(12) United States Patent
Pedder et al.

(10) Patent No.: US 10,852,553 B2
(45) Date of Patent: Dec. 1, 2020

(54) ELECTRONIC DEVICE WITH A TUNABLE LENS

(71) Applicant: Apple Inc., Cupertino, CA (US)

(72) Inventors: James E. Pedder, Oxon (GB); Igor Stamenov, Cupertino, CA (US); Cheng Chen, San Jose, CA (US); Enkhamgalan Dorjgotov, Mountain View, CA (US); Graham B. Myhre, San Jose, CA (US); Victoria C. Chan, Sunnyvale, CA (US); Xiaonan Wen, San Jose, CA (US); Peng Lv, Cupertino, CA (US); Yuan Li, Cupertino, CA (US); Yu Horie, Pasadena, CA (US); Siddharth S. Hazra, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/520,200

(22) Filed: Jul. 23, 2019

(65) Prior Publication Data
US 2020/0096770 A1 Mar. 26, 2020

Related U.S. Application Data

(60) Provisional application No. 62/815,793, filed on Mar. 8, 2019, provisional application No. 62/734,610, filed on Sep. 21, 2018.

(51) Int. Cl.
*G02B 27/01* (2006.01)
*G02B 3/12* (2006.01)
*G02B 3/00* (2006.01)

(52) U.S. Cl.
CPC .......... *G02B 27/0172* (2013.01); *G02B 3/12* (2013.01); *G02B 27/0176* (2013.01); *G02B 2003/0093* (2013.01)

(58) Field of Classification Search
CPC .... G02B 27/0172; G02B 3/12; G02B 26/004; G02B 3/14
See application file for complete search history.

(56) References Cited

U.S. PATENT DOCUMENTS 9,400,384 B2 7/2016 Griffith et al.
9,529,194 B2 12/2016 Yoo et al.
(Continued)

FOREIGN PATENT DOCUMENTS

DE 102007004080 A1 8/2008
EP 2034338 A1 3/2009
(Continued)

OTHER PUBLICATIONS

Liebetraut et al., "Elastomeric lenses with tunable astigmatism", Article, Sep. 13, 2013, 6 pages, Light: Science & Applications doi:10.1038/lsa.2013.54, Freiburg, Germany.
(Continued)

*Primary Examiner* — Kevin M Nguyen
(74) *Attorney, Agent, or Firm* — Treyz Law Group, P.C.; Joseph F. Guihan

(57) ABSTRACT

A lens module in a head-mounted device may include a fluid-filled chamber, a semi-rigid lens element that at least partially defines the fluid-filled chamber, and at least one actuator configured to selectively bend the semi-rigid lens element. The semi-rigid lens element may become rigid along a first axis when the lens element is curved along a second axis perpendicular to the first axis. Six actuators that are evenly distributed around the periphery of the semi-rigid lens element may be used to control the curvature of the semi-rigid lens element. The semi-rigid lens element may initially be planar or non-planar. For example, the semi-rigid lens element may initially have a spherically convex surface and a spherically concave surface. A tunable spherical lens (Continued)

may be incorporated into the lens module to offset a parasitic spherical lens power from the semi-rigid lens element.

23 Claims, 17 Drawing Sheets

(56) References Cited

U.S. PATENT DOCUMENTS

| | | | |
|---|---|---|---|
| 10,055,889 B2 | 8/2018 | Bar-Zeev et al. | |
| 2009/0195882 A1 | 8/2009 | Bolle et al. | |
| 2012/0092775 A1* | 4/2012 | Duston | G02B 3/14 |
| | | | 359/666 |
| 2013/0128368 A1* | 5/2013 | Costache | G02B 26/004 |
| | | | 359/666 |
| 2017/0017019 A1* | 1/2017 | Bolis | G02B 26/004 |
| 2017/0276944 A1 | 9/2017 | Kim et al. | |
| 2019/0243123 A1* | 8/2019 | Bohn | G02B 6/122 |
| 2019/0302479 A1* | 10/2019 | Smyth | G02B 26/06 |
| 2019/0369303 A1* | 12/2019 | Zhao | G02B 3/14 |

FOREIGN PATENT DOCUMENTS

| | | |
|---|---|---|
| WO | 2006011937 A2 | 2/2006 |
| WO | 2009120152 A1 | 10/2009 |
| WO | 2013096052 A2 | 6/2013 |
| WO | 2015107362 A1 | 7/2015 |

OTHER PUBLICATIONS

Amirsolaimani et al., "A new low-cost, compact, autophoropter for refractive assessment in developing countries", Article, Oct. 25, 2017, 7 pages, Scientific Reports, 7: 13990 | DOI:10.1038/s41598-017-14507-5, Tucson, Arizona.

Blum et al, Compact optical design solutions using focus tunable lenses, 2012, Optotune AG, Bernstrasse 388, 8953 Dietikon, Switzerland.

\* cited by examiner

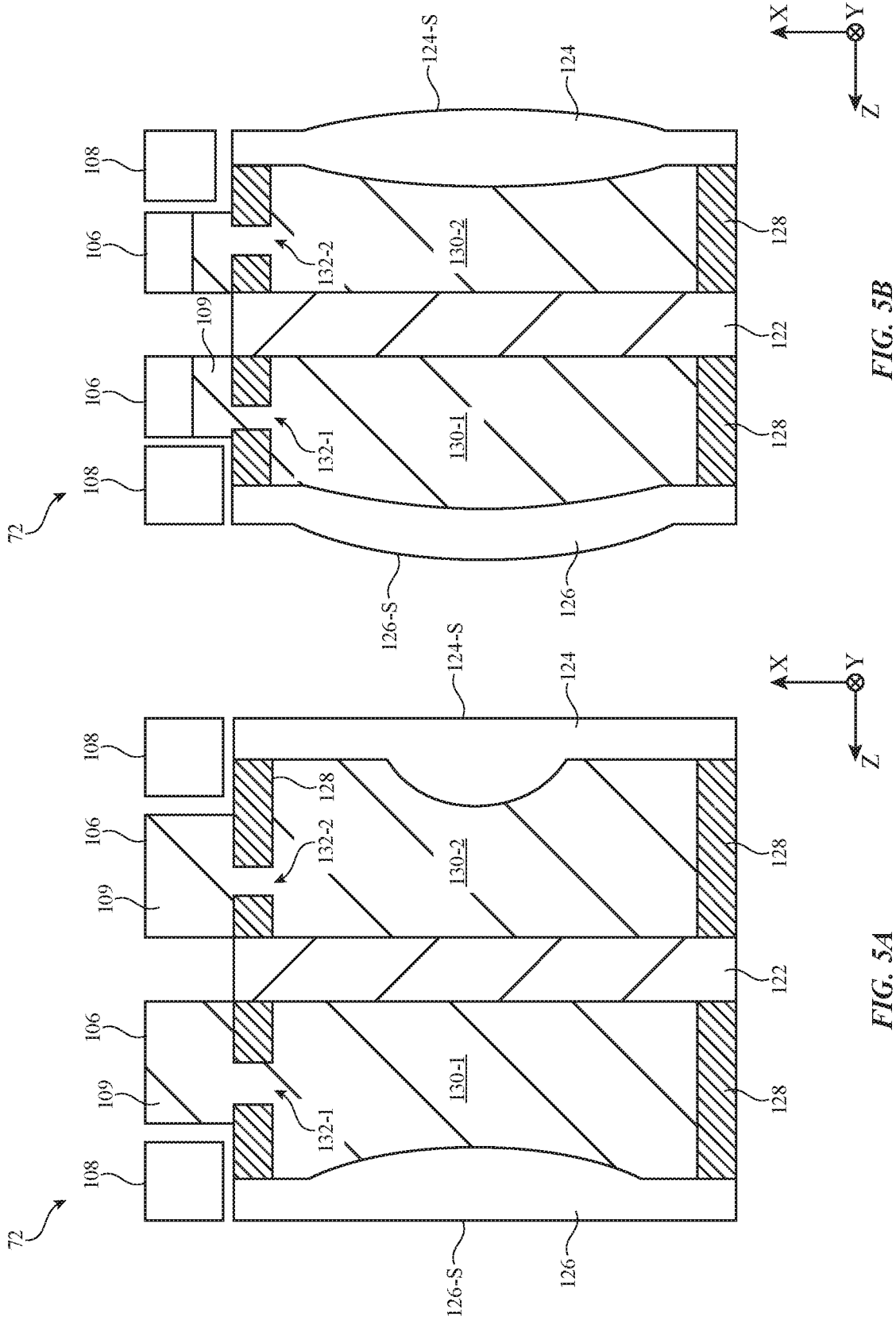

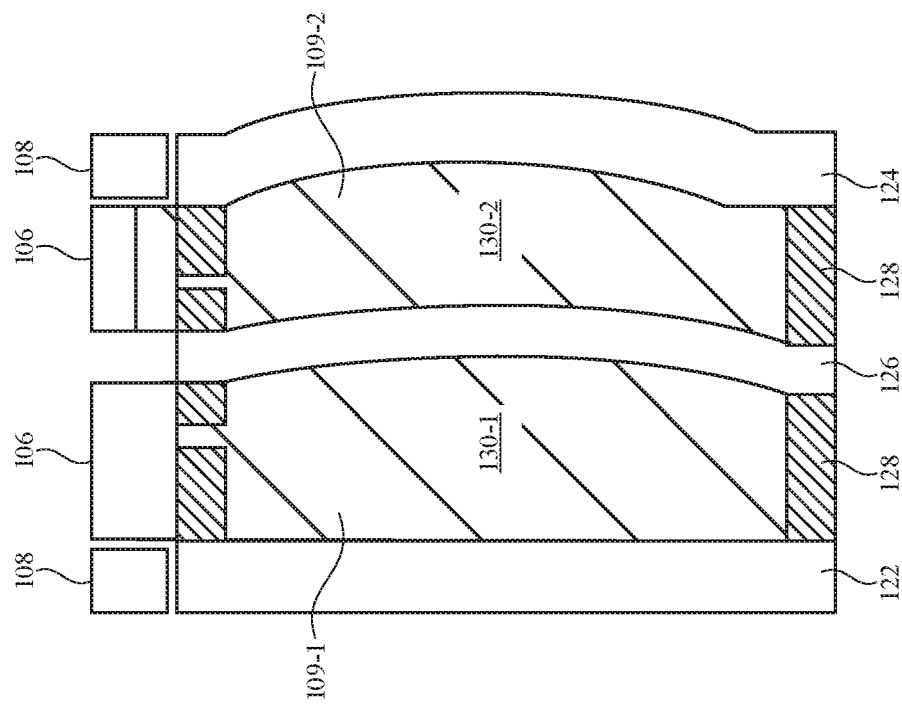
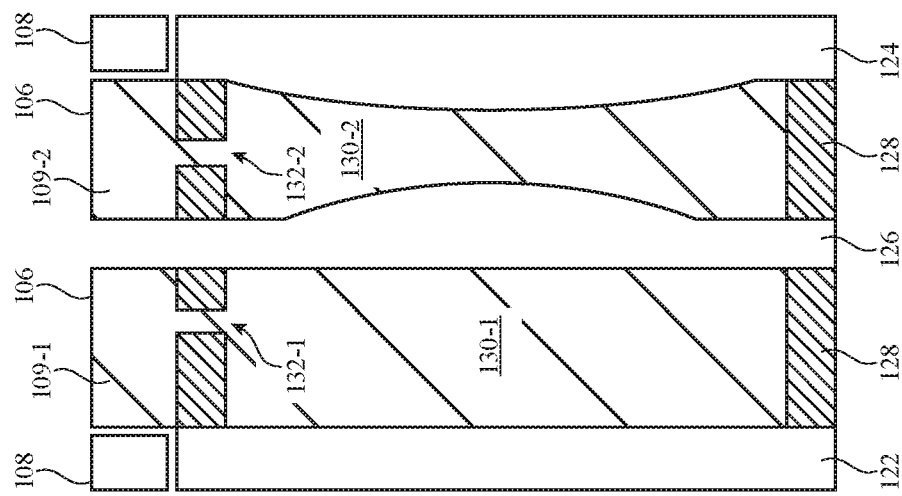
FIG. 7B
FIG. 7A

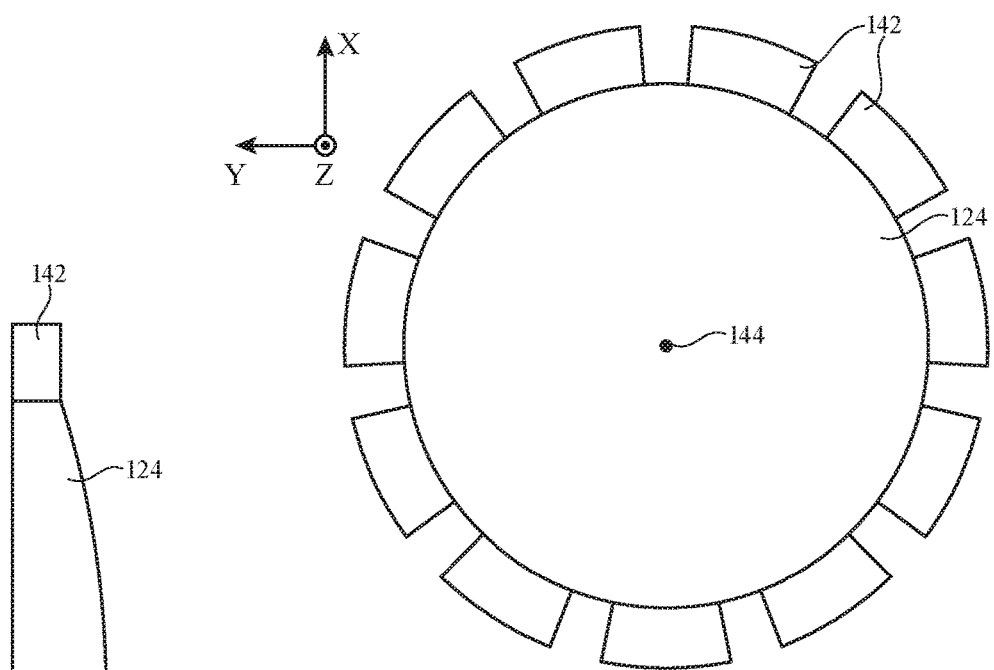
FIG. 10B
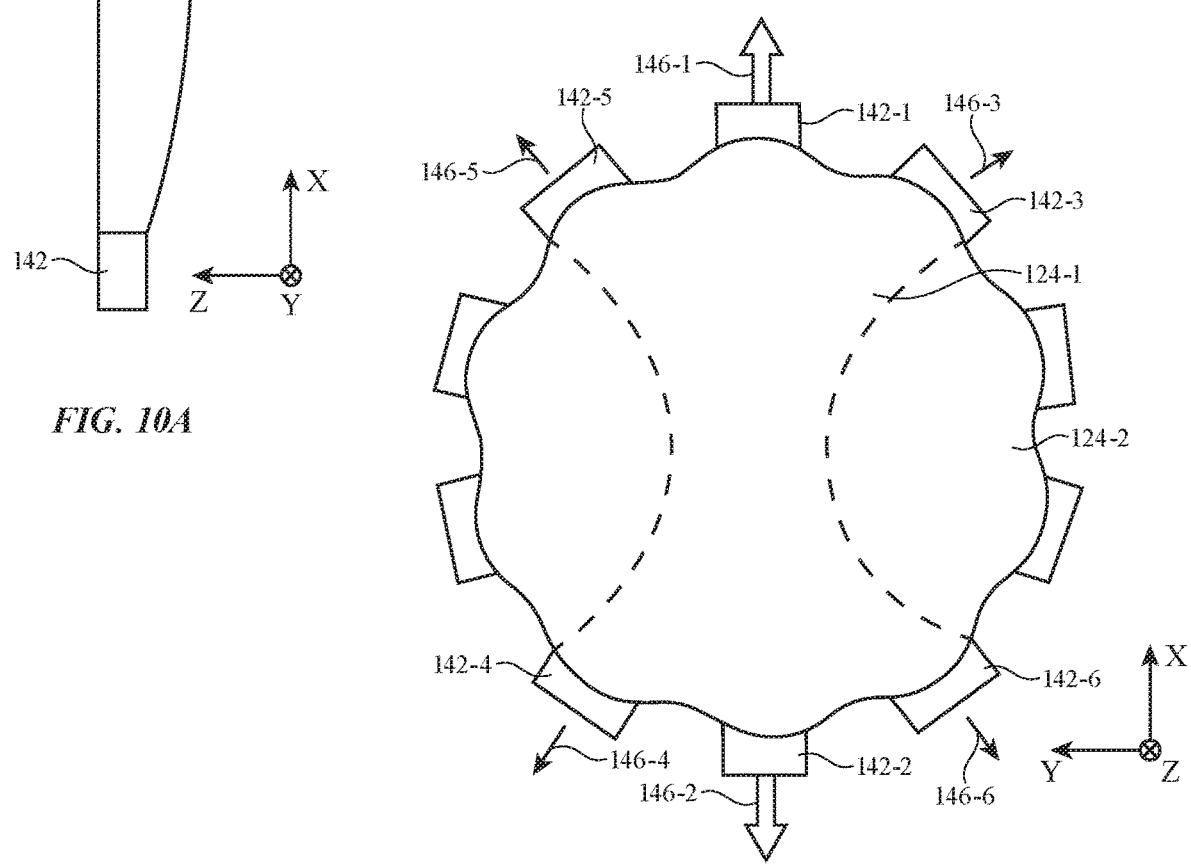
FIG. 10A
FIG. 10C

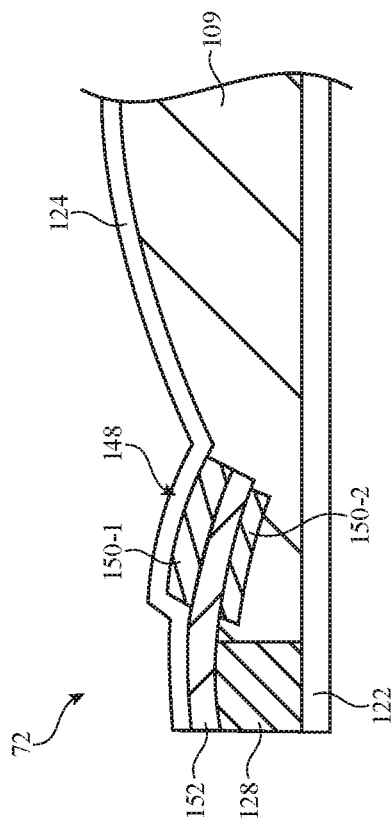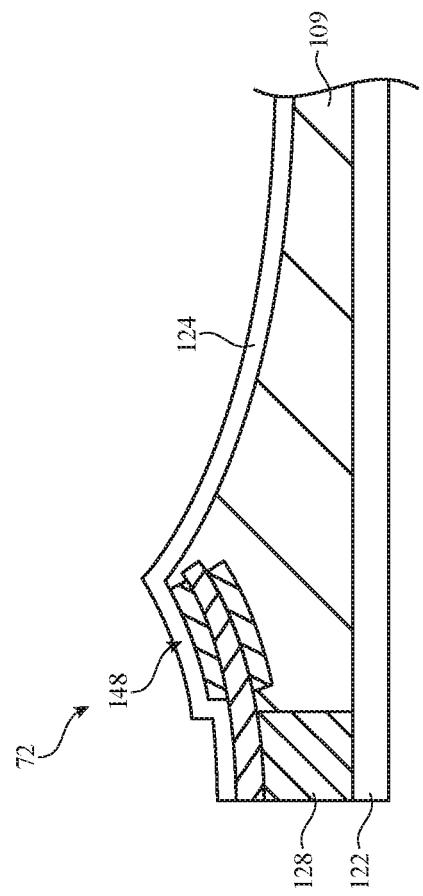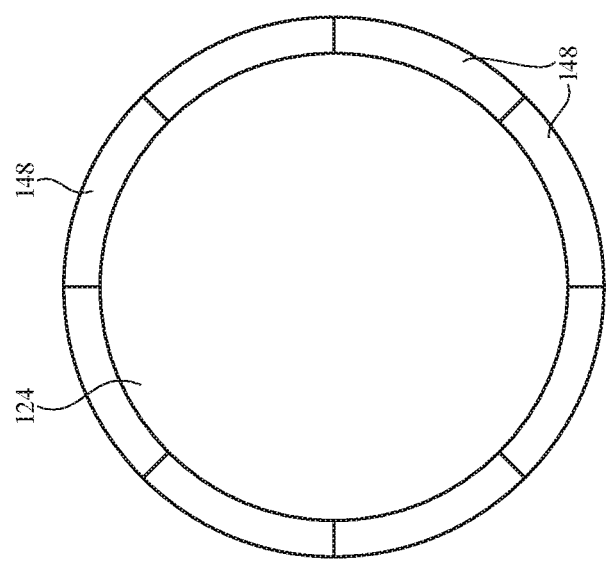

ELECTRONIC DEVICE WITH A TUNABLE LENS

This application claims the benefit of provisional patent application No. 62/734,610, filed Sep. 21, 2018, and provisional patent application No. 62/815,793, filed Mar. 8, 2019, which are hereby incorporated by reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

Head-mounted devices typically include lenses with fixed shapes and properties. If care is not taken, it may be difficult to adjust these types of lenses to optimally present content to each user of the head-mounted device.

SUMMARY

A head-mounted device may have a display that displays content for a user. Head-mounted support structures in the device support the display on the head of the user.

The head-mounted device may have respective left and right lenses and respective left and right portions of a display. The left lens may direct images from the left portion of the display to a left eye box whereas the right lens may direct images from the right portion of the display to a right eye box.

A lens module in the head-mounted device may include first and second lens elements separated by a liquid-filled gap with an adjustable thickness. A pump or other component may control how much liquid is forced from a liquid reservoir into the liquid-filled gap. The first and second lens elements may form a catadioptric lens having a thickness that depends upon the adjustable thickness of the liquid-filled gap.

A lens module in the head-mounted device may include first and second fluid-filled chambers and first and second flexible membranes. Control circuitry in the head-mounted device may control a first amount of fluid in the first fluid-filled chamber and a second amount of fluid in the second fluid-filled chamber to adjust curvature of the first flexible membrane and curvature the second flexible membrane. The first and second flexible membranes may have different varying stiffness profiles. The varying stiffness profiles may be a result of the flexible membranes having a varying thickness, having surface relief that varies the elastic modulus of the flexible membranes, or being formed from an anisotropic material.

A lens module in the head-mounted device may include a flexible lens element with a periphery and a plurality of actuators around the periphery of the flexible lens element. Control circuitry in the head-mounted device may control the plurality of actuators to dynamically adjust the flexible lens element. Each actuator may pull radially outward on the flexible lens element away from a center of the flexible lens element or may bend or compress the periphery of the flexible lens element. The actuators may be piezoelectric actuators or voice coil actuators.

In some cases, a lens module may include a fluid-filled chamber, a semi-rigid lens element that at least partially defines the fluid-filled chamber, and at least one actuator configured to selectively bend the semi-rigid lens element. In contrast to an elastomeric lens element, which remains flexible along a first axis even when the lens element is curved along a second axis perpendicular to the first axis, the semi-rigid lens element may become rigid along a first axis when the lens element is curved along a second axis perpendicular to the first axis. Six actuators that are evenly distributed around the periphery of the semi-rigid lens element may be used to control the curvature of the semi-rigid lens element. The semi-rigid lens element may initially be planar or non-planar. For example, the semi-rigid lens element may initially have a spherically convex surface and a spherically concave surface. A tunable spherical lens may be incorporated into the lens module to offset a parasitic spherical lens power from the semi-rigid lens element

BRIEF DESCRIPTION OF THE DRAWINGS

FIGS. 5A and 5B are cross-sectional side views of an illustrative lens module for a head-mounted device that includes two fluid-filled chambers that control the shapes of respective elastomeric membranes in accordance with an embodiment.

FIGS. 7A and 7B are cross-sectional side views of an illustrative lens module for a head-mounted device that includes two fluid-filled chambers filled with different types of fluids in accordance with an embodiment.

FIG. 10A is a cross-sectional side view of an illustrative elastomeric membrane that is attached to actuators that are controlled for dynamic stiffness tuning in accordance with an embodiment.

FIGS. 10B and 10C are top views of the elastomeric membrane of FIG. 10A showing how the actuators perform dynamic stiffness tuning in accordance with an embodiment.

FIG. 11A is a top view of illustrative elastomeric membrane that includes actuators that are controlled for edge bending in accordance with an embodiment.

FIGS. 11B and 11C are cross-sectional side views of the elastomeric membrane of FIG. 11A showing how a piezoelectric actuator may control the shape of the elastomeric membrane in accordance with an embodiment.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. The lens system may have a left lens module that is aligned with a user's left eye and a right lens module that is aligned with a user's right eye.

The lens modules in the head-mounted device may include lenses that are adjustable. For example, fluid-filled adjustable lenses may be used to adjust the display content for specific viewers.

Figure 1:
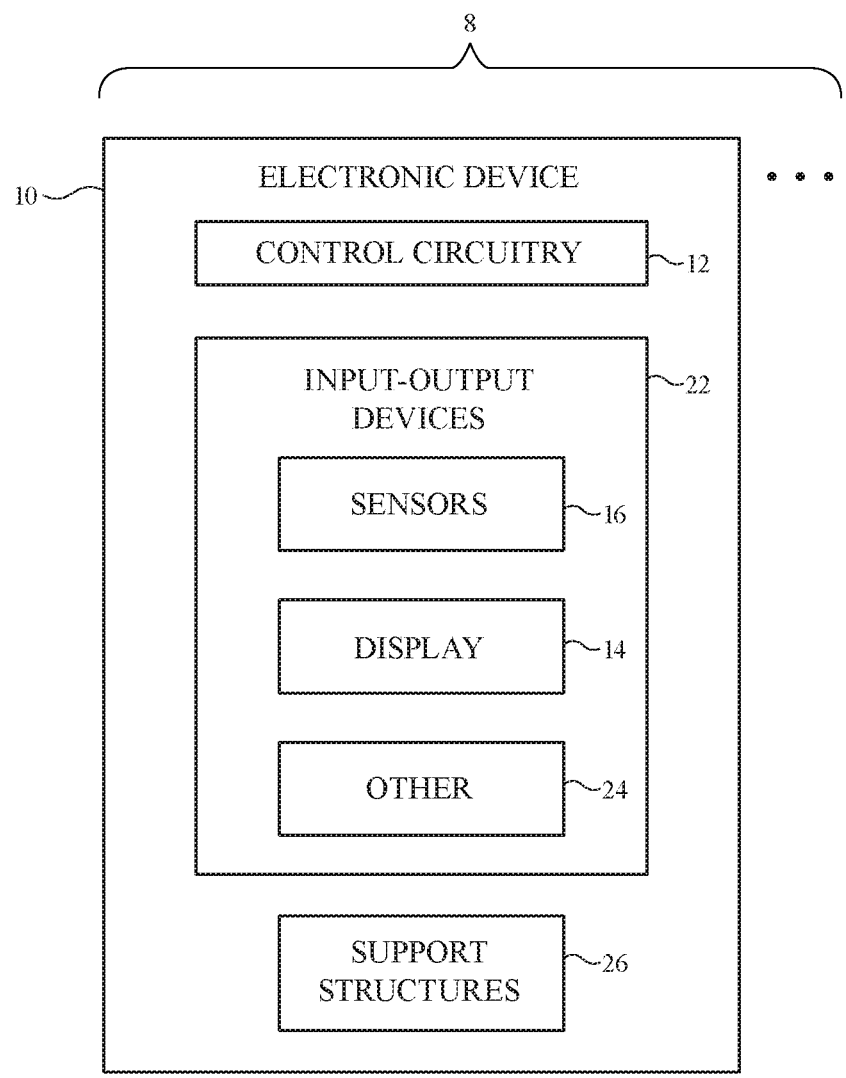
FIG. 1 is a schematic diagram of an illustrative electronic device such as a head-mounted display device in accordance with an embodiment.

A schematic diagram of an illustrative system having an electronic device with a lens module is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the Internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Display 14 may present display content for a computer-generated reality such as virtual reality content or mixed reality content.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Configurations in which display 14 is used to display virtual reality content to a user through lenses are described herein as an example.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16 may include proximity sensors (e.g., capacitive proximity sensors, light-based (optical) proximity sensors, ultrasonic proximity sensors, and/or other proximity sensors). Proximity sensors may, for example, be used to sense relative positions between a user's nose and lens modules in device 10.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
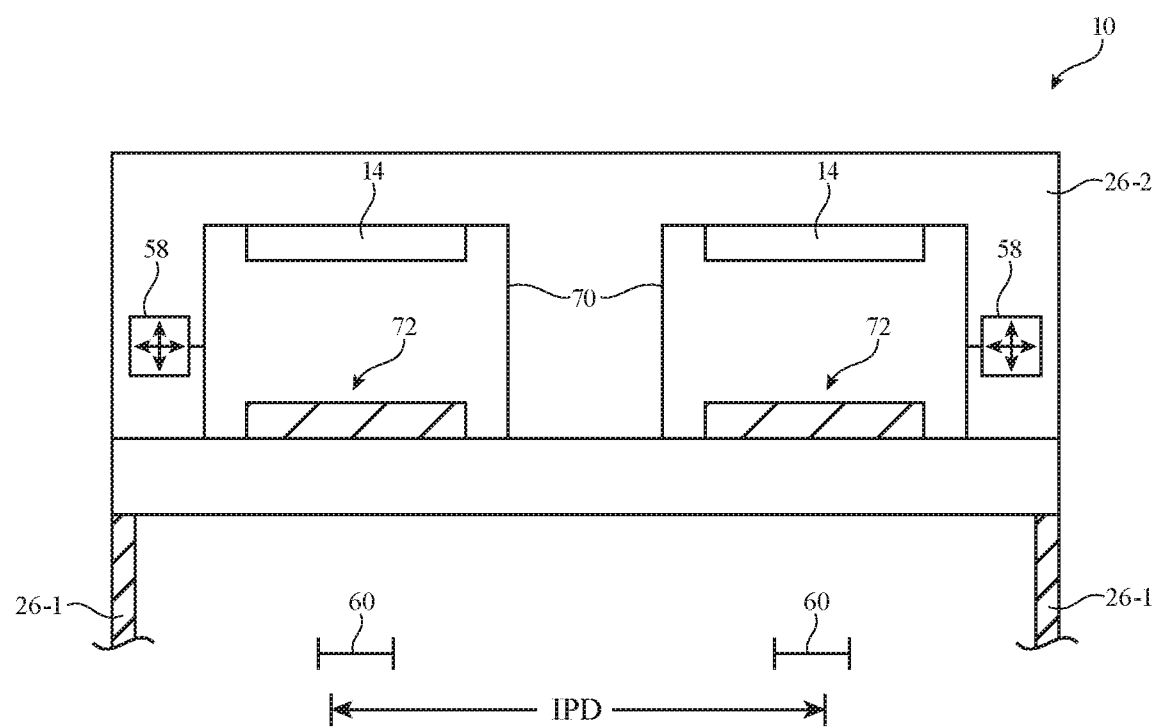
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 (e.g., exterior housing walls, lens module structures, etc.) and straps or other supplemental support structures such as structures 26-1 that help to hold main unit 26-2 on a user's face so that the user's eyes are located within eye boxes 60.

Display 14 may include left and right display panels (e.g., left and right pixel arrays, sometimes referred to as left and right displays or left and right display portions) that are mounted respectively in left and right display modules 70 corresponding respectively to a user's left eye (and left eye box 60) and right eye (and right eye box 60).

Each display module 70 includes a display portion 14 and a corresponding lens module 72 (sometimes referred to as lens stack-up 72 or lens 72). Lenses 72 may include one or more lens elements arranged along a common axis. Each lens element may have any desired shape and may be formed from any desired material (e.g., with any desired refractive index). The lens elements may have unique shapes and refractive indices that, in combination, focus light from display 14 in a desired manner. Each lens element of lens module 72 may be formed from any desired transparent material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as respective left and right positioners 58. Positioners 58 may be stepper motors, piezoelectric actuators, motors, linear electromagnetic actuators, and/or other electronic components for adjusting the position of displays 14 and lens modules 72. Positioners 58 may be controlled by control circuitry 12 during operation of device 10. For example, positioners 58 may be used to adjust the spacing between modules 70 (and therefore the lens-to-lens spacing between the left and right lenses of modules 70) to match the interpupillary distance IPD of a user's eyes.

In some cases, the distance between lens module 72 and display 14 is variable. For example, the distance between the lens module and the display any be adjusted to account for the eyesight of a particular user. An illustrative head-mounted device with a lens module 72 that can move relative to the display is shown in FIG. 3.

Figure 3:
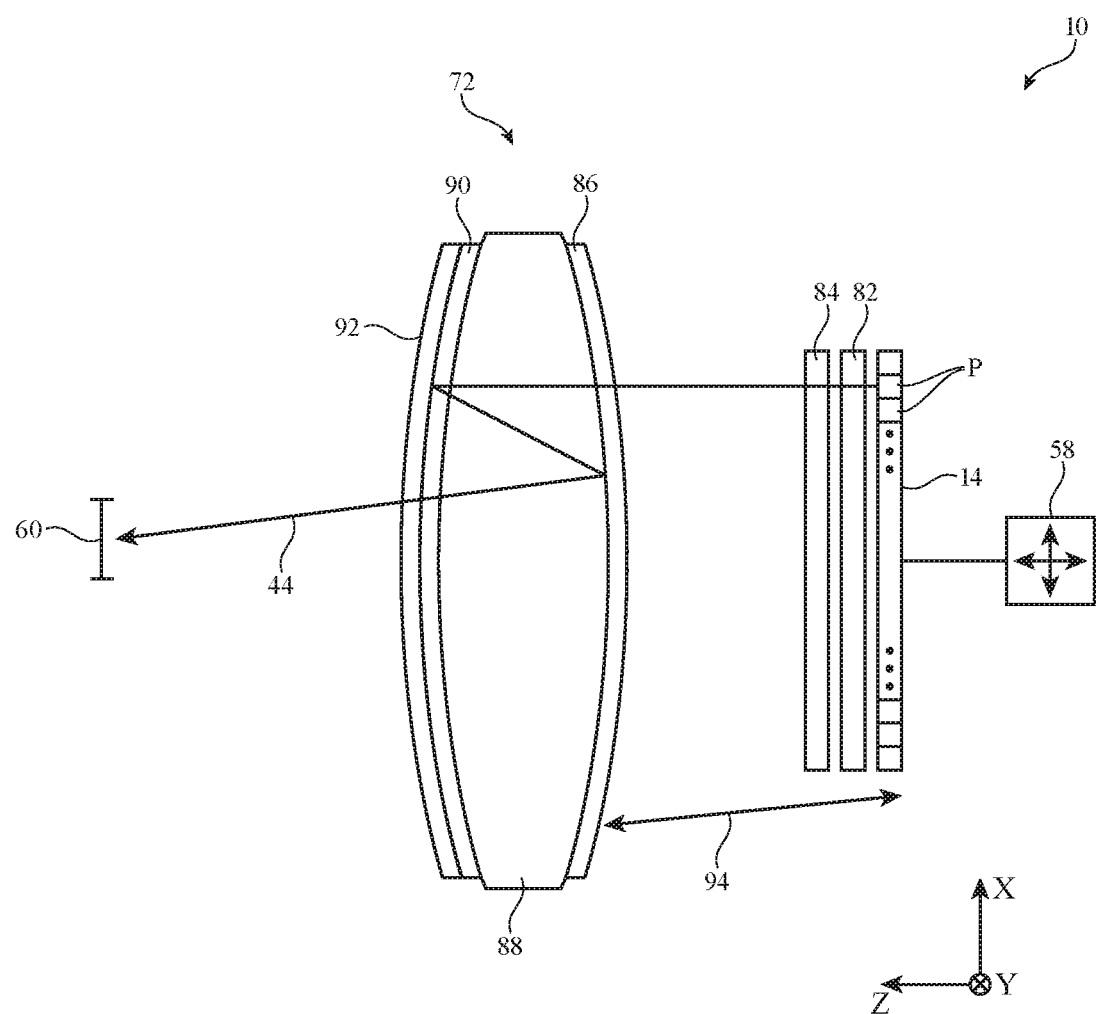
FIG. 3 is a cross-sectional side view an illustrative head-mounted device with a catadioptric lens that receives light from a display portion in accordance with an embodiment.

As shown in FIG. 3, head-mounted device 10 (e.g., a display module 70 within the head-mounted device) may include a source of images such as pixel array 14. Pixel array 14 may include a two-dimensional array of pixels P that emits image light (e.g., organic light-emitting diode pixels, light-emitting diode pixels formed from semiconductor dies, liquid crystal display pixels with a backlight, liquid-crystal-on-silicon pixels with a frontlight, etc.). In FIG. 3, a catadioptric optical system is shown. A polarizer such as linear polarizer 82 may be placed in front of pixel array 14 and/or may be laminated to pixel array 14 to provide polarized image light. Linear polarizer 82 may have a pass axis aligned with the X-axis of FIG. 3 (as an example). A quarter wave plate 84 may also be provided on display 14. The quarter wave plate may provide circularly polarized image light. The fast axis of quarter wave plate 84 may be aligned at 45 degrees to the pass axis of linear polarizer 82. Quarter wave plate 84 may be mounted in front of polarizer 82 (between polarizer 82 and lens module 72). If desired, quarter wave plate 84 may be attached to polarizer 82 (and display 14).

Lens module 72 may include one or more lens elements such as lens element 88. Lens element 88 is depicted as having a convex surface facing display 14 and a convex surface facing eye box 60. This example is merely illustrative, and lens element 88 may have any desired shape (e.g., each surface of lens element 88 may be planar, convex, or concave). Lens element 88 may be a rigid lens element formed from glass, a polymer material such as polycarbonate or acrylic, a crystal such as sapphire, etc.

Optical structures such as partially reflective coatings, wave plates, reflective polarizers, linear polarizers, antireflection coatings, and/or other optical components may be incorporated into head-mounted device 10. These optical structures may allow light rays from display 14 to pass through and/or reflect from surfaces in lens element 88, thereby providing lens module 72 with a desired lens power.

For example, a partially reflective mirror (e.g., a metal mirror coating or other mirror coating such as a dielectric multilayer coating with a 50% transmission and a 50% reflection) such as partially reflective mirror 86 may be formed on lens element 88 (e.g., between the lens element and display 14). Quarter wave plate 90 and reflective polarizer 92 may be formed on the opposing surface of lens element 88 (e.g., between lens element 88 and eye box 60). Light such as light 44 may pass through the catadioptric lens. The example of a catadioptric lens shown in FIG. 3 is merely illustrative. In general, lens 72 module may have any desired optical structures (e.g., partially reflective coatings, wave plates, reflective polarizers, linear polarizers, antireflection coatings, etc.) at any desired locations within the lens module. Additional lens elements may be incorporated into lens module 72 and each lens element may have any desired shape.

As shown in FIG. 3, head-mounted device 10 may include a positioner 58 for adjusting the distance 94 between lens module 72 (e.g., lens element 88) and display 14. Positioner 58 may include one or more stepper motors, piezoelectric actuators, motors, linear electromagnetic actuators, and/or other electronic components for adjusting the position of display 14. Positioner 58 may be controlled by control circuitry 12 during operation of device 10 to adjust the position of display 14 relative to lens module 72.

Adjusting the position of display 14 relative to lens module 72 may be useful for accounting for the eyesight of different users. Some users may have myopia (nearsightedness) whereas other users may have hyperopia (farsightedness). The vision of each user's eye may differ. Therefore, independently controlling the lens power of each lens module to account for the vision of the user may be desirable. Including positioner 58 in head-mounted device 10 to move the position of display 14 relative to lens module 72 may allow adjustment of the lens power of each lens module. However, the positioner may be more expensive than desired and may undesirably add excess weight to the head-mounted device. To allow adjustment of the lens module without including positioners to physically move the position of the display, an arrangement of the type shown in FIGS. 4A and 4B may be used.

Figure 4A:
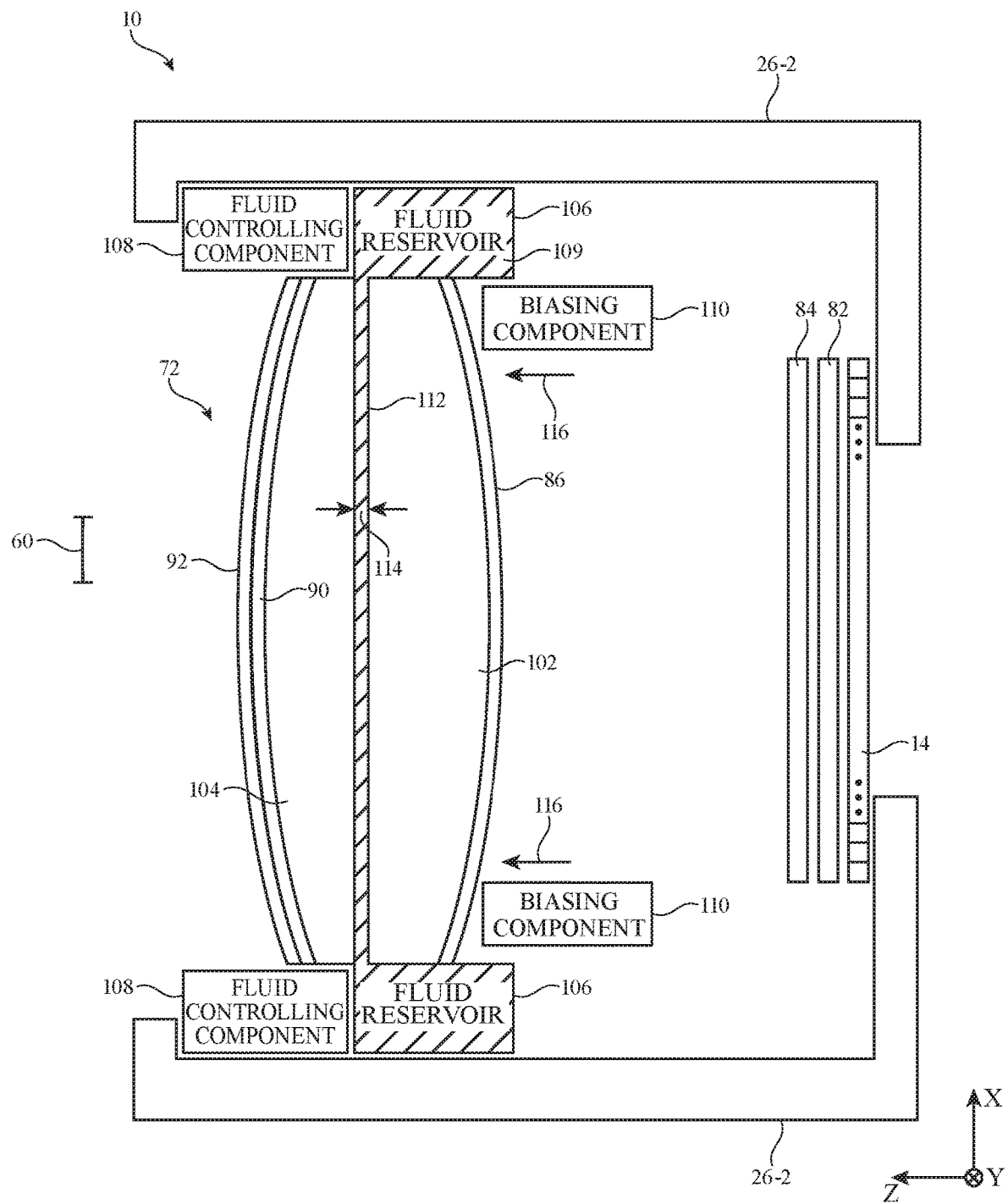
FIGS. 4A and 4B are cross-sectional side views of an illustrative head-mounted device with a catadioptric lens that includes two lens elements separated by a fluid-filled gap having a variable thickness in accordance with an embodiment.

In FIG. 4A, a head-mounted device is shown where a fluid-filled adjustable gap is interposed between two lens elements for lens module tuning. As shown in FIG. 4A, similar to FIG. 3, a display 14 with pixels P covered by a linear polarizer 82 and a quarter wave plate 84 may emit light. The light may be received by a lens module 72 that includes first and second lens elements 102 and 104 separated by a fluid-filled adjustable gap 112 (sometimes referred to as liquid-filled adjustable gap 112). The thickness 114 of the fluid-filled adjustable gap 112 may be controlled by the amount of fluid in the gap. Adjusting the thickness of the fluid-filled adjustable gap may adjust the lens power of lens 72.

As shown in FIG. 4A, fluid 109 may be stored in one or more fluid reservoirs 106. Fluid 109 may be a liquid, gel, or gas with a pre-determined index of refraction (and may therefore sometimes be referred to as liquid 109, gel 109, or gas 109). The fluid may sometimes be referred to as an index-matching oil, an optical oil, an optical fluid, an index-matching material, an index-matching liquid, etc. Lens elements 102 and 104 may have the same index of refraction or may have different indices of refraction. Fluid 109 that fills gap 112 between lens elements 102 and 104 may have an index of refraction that is the same as the index of refraction of lens element 102 but different from the index of refraction of lens element 104, may have an index of refraction that is the same as the index of refraction of lens element 104 but different from the index of refraction of lens element 102, may have an index of refraction that is the same as the index of refraction of lens element 102 and lens element 104, or may have an index of refraction that different from the index of refraction of lens element 102 and lens element 104. Lens elements 102 and 104 may be circular, may be elliptical, or may have any another desired shape.

One or more fluid controlling components 108 (sometimes referred to as liquid controlling components 108) may be included in head-mounted device 10 to control the amount of fluid in fluid-filled gap 112 (and therefore the thickness of gap 112). Fluid-filled gap 112 may sometimes be referred to as a fluid lens element or liquid lens element having a variable thickness. The fluid controlling components may be pumps that pump fluid from reservoirs 106 into fluid-filled gap 112. The fluid controlling components may include other desired components to force liquid from the fluid reservoirs into gap 112. For example, fluid controlling component 108 may include one or more stepper motors, piezoelectric actuators, motors, linear electromagnetic actuators, and/or other electronic components that apply a force to the fluid in the fluid reservoir (e.g., by pressing a membrane on the fluid in the fluid reservoir) to push the fluid into the gap.

One or more biasing components 110 may be included in the head-mounted device to apply a bias force to lens element 102 in direction 116. Sufficient bias force may be applied to lens element 102 to maintain the desired thickness of gap 112 while allowing adjustment of the width of gap 112. Biasing components 110 may include springs, piezoelectric actuators, motors, linear electromagnetic actuators, and/or other electronic components. The example of FIG. 4A of biasing components 110 being formed between lens element 102 and display 14 and applying the bias force in direction 116 is merely illustrative. If desired, one or more biasing components may be formed on the other side of the lens module (e.g., between lens element 104 and eye box 60) and may apply a bias force to lens element 104 in the opposite direction as direction 116. One or more of the lens elements 102 and 104 (e.g., the lens element that does not receive the bias force) may be fixed (e.g., to support structure 26-2).

In FIG. 4A, fluid-filled gap 112 has first and second opposing planar surfaces. This example is merely illustrative. If desired, the surfaces defining fluid-filled gap 112 may be curved (either towards eye box 60 or towards display 14). Both lens elements 102 and 104 may be rigid lens elements formed from a transparent material such as glass, a polymer material such as polycarbonate or acrylic, a crystal such as sapphire, etc. Lens elements 102 and 104 may have any desired shape (e.g., biconvex, plano-convex, positive meniscus, negative meniscus, plano-concave, biconcave, etc.).

In FIG. 4A, lens module 72 has been described as including first and second lens elements that are separated by a fluid-filled gap. However, lens module 72 may sometimes instead be described as a single split lens element with a variable thickness that is controlled by the thickness of the intervening fluid-filled gap.

Figure 4B:
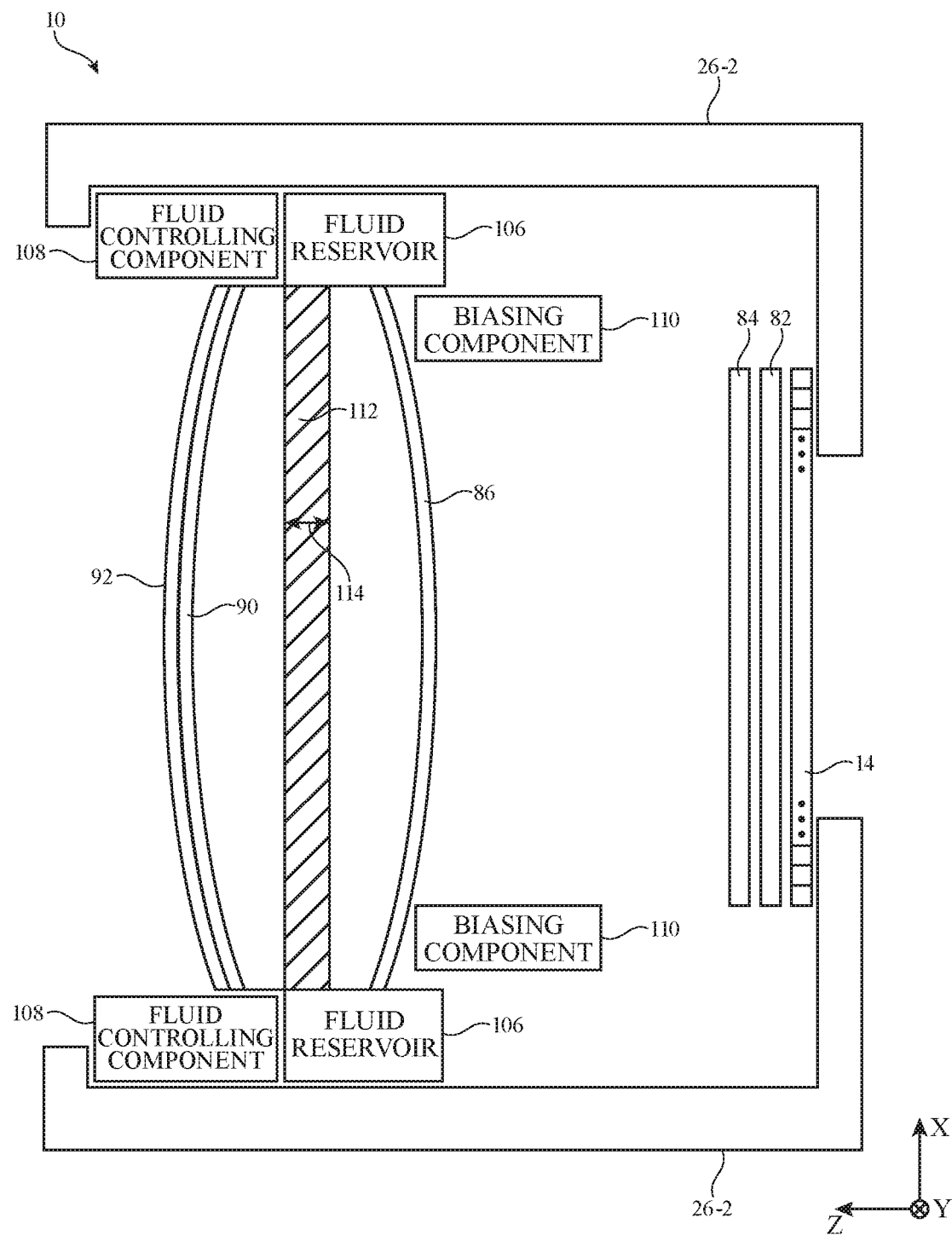

FIG. 4B shows the head-mounted device of FIG. 4A in a state in which the fluid in fluid reservoirs 106 have been forced into fluid-filled gap 112. Therefore, in FIG. 4B, the thickness 114 of fluid-filled gap 112 is greater than the thickness of the fluid-filled gap in FIG. 4A. Adjusting the thickness in this way may allow the lens power of lens module 72 to be adjusted. The thickness of fluid-filled gap 112 may vary by any desired amount. In other words, the difference between the minimum thickness of fluid-filled gap 112 and the maximum thickness of fluid-filled gap 112 may be between 0.3 millimeters and 1.0 millimeters, between 0.4 millimeters and 0.6 millimeters, greater than 0.2 millimeters, greater than 0.3 millimeters, greater than 0.4 millimeters, greater than 0.5 millimeters, greater than 0.8 millimeters, greater than 1.0 millimeters, greater than 2.0 millimeters, less than 2.0 millimeters, less than 1.0 millimeters, less than 0.8 millimeters, etc. The minimum achievable lens power of the adjustable lens module may be −10 diopter (D), −8 D, −6 D, −4 D, less than −1 D, less than −3 D, less than −5 D, less than −7 D, etc. The maximum achievable lens power of the adjustable lens module may be 10 D, 8 D, 6 D, 4 D, greater than 1 D, greater than 3 D, greater than 5 D, greater than 7 D, etc.

A smaller tunable range for lens module 72 may allow for faster tuning of the lens module. For example, if lens module 72 can be adjusted between −1 D and 1 D, the lens module can be tuned faster than if lens module 72 can be adjusted between −6 D and 6 D. If the lens module can be tuned fast enough, a multi-focal experience may be possible (with rapid switching between two different lens powers).

FIG. 5A shows a lens module that may be used for astigmatism correction. As shown in FIG. 5A, lens module 72 may include a rigid divider 122 (sometimes referred to as a rigid lens element 122) between tunable fluid chambers 130-1 and 130-2. A first elastomeric membrane 126 may be formed on the left fluid chamber 130-1 (e.g., facing the eye box) and a second elastomeric membrane 124 may be formed on the right fluid chamber 130-2 (e.g., facing the display). Lens module support structures 128 may also help define the fluid chambers. Elastomeric membranes 124 and 126 may be formed from any desired material and may sometimes be referred to as flexible membranes, elastic membranes, elastomeric lens elements, flexible lens elements, elastic lens elements, etc.

Fluid chamber 130-1 is defined by rigid divider 122, lens module support structures 128, and elastomeric membrane 126. Fluid chamber 130-1 has an inlet 132-1 formed in the lens module support structures. Fluid 109 from fluid reservoir 106 may be pumped or forced into the fluid chamber through inlet 132-1 by fluid controlling component 108. Fluid chamber 130-2 is defined by rigid divider 122, lens module support structures 128, and elastomeric membrane 124. Fluid chamber 130-2 has an inlet 132-2 formed in the lens module support structures. Fluid 109 from fluid reservoir 106 may be pumped into the fluid chamber through inlet 132-2 by fluid controlling component 108.

Rigid divider 122 may be formed from glass or another desired transparent material. Elastomeric membrane 126, the fluid in chamber 130-1, divider 122, the fluid in chamber 130-2, and elastomeric membrane 124 (which may all be referred to as respective lens elements) may all have any desired refractive index. In other words, each lens element may have the same refractive index as an adjacent lens element or a different refractive index than an adjacent component. In one example, elastomeric membrane 126 and the fluid in chamber 130-1 may have the same refractive index. Elastomeric membrane 124 and the fluid in chamber 130-2 may have the same refractive index. The fluid in each fluid-filled chamber may sometimes be referred to as an index-matching oil, an optical oil, an optical fluid, an index-matching material, an index-matching liquid, etc. The fluid in chamber 130-1 may be the same type of fluid as the fluid in chamber 130-2. Alternatively, different types of fluids may be used in chambers 130-1 and 130-2.

The amount of fluid in chambers 130-1 and 130-2 may determine the shape of the respective elastomeric membranes. For example, membrane 124 has a surface 124-S with curvature that is dependent upon the amount of fluid in fluid-filled chamber 130-2. Membrane 126 has a surface 126-S with curvature that is dependent upon the amount of fluid in fluid-filled chamber 130-1. The amount of fluid in each chamber may be independently controlled (e.g., by respective fluid controlling components) to control the lens module 72.

To allow for correction of astigmatism in the user of head-mounted device 10, elastomeric membranes 124 and 126 have varying stiffness across the membranes. One or both of the membranes may have concentric stiffness variation for off-axis optical correction. One or both of the membranes may have linear stiffness variation for astigmatic optical correction. By varying the stiffness across the membranes, the elastomeric membranes will be aspheric (because the more-stiff portions will be less displaced by the fluid in the fluid-filled chamber than the less-stiff portions). For example, elastomeric membrane 126 may be stiffer in the X-axis than in the Y-axis. In contrast, elastomeric membrane 124 may be stiffer in the Y-axis than in the X-axis. Instead, the opposite could be true (with elastomeric membrane 124 stiffer in the X-axis than in the Y-axis and elastomeric membrane 126 stiffer in the Y-axis than in the X-axis). Independently controlling these two membranes allows for astigmatism correction.

The varying stiffness profile of the two elastomeric membranes may be achieved in several different ways. In one example, the membrane stiffness profile may be achieved with a variable thickness. In other words, the membrane may have first portions that are thicker (and therefore stiffer) than second portions. Alternatively or in addition to having a variable thickness, the elastomeric membranes may have recesses that reduce stiffness. In other words, the elastomeric membranes may have a varying elastic modulus across the membrane. For example, laser grooving may create grooves in portions of the elastomeric membrane, making the elastomeric membrane less stiff in those portions. Any types of grooves or recesses may be formed in the elastomeric membrane. These features may sometimes be referred to as surface relief. Any desired techniques may be used to form the surface relief (e.g., laser grooving, nano-imprinting, etc.). Alternatively or in addition to having a variable thickness and/or surface relief, the elastomeric membrane may be formed from an anisotropic material. The anisotropic material may have a stiffness that varies when measured in different directions. Any desired anisotropic material may be used to form the elastomeric membranes (e.g., fiber-reinforced composite).

FIG. 5B shows how the fluid filled-chambers may be filled be different amounts to control the shapes of surfaces 124-S and 126-S. Fluid controlling components 108 may be controlled by control circuitry 12 (see FIG. 1) to pump a selected amount of fluid into each fluid-filled chamber. Different amounts of fluid may be in each chamber for independent control of elastomeric membranes 124 and 126. In FIG. 5B, more fluid has been pumped into chamber 130-1 than into chamber 130-2 (resulting in surface 126-S of elastomeric membrane 126 having more curvature than surface 124-S of elastomeric membrane 124). The fluid controlling components may be pumps that pump fluid from reservoirs 106 into fluid-filled chambers 130-1 and 130-2. Fluid controlling components 108 may include one or more stepper motors, piezoelectric actuators, motors, linear electromagnetic actuators, and/or other electronic components that apply a force to the fluid in the fluid reservoir (e.g., by pressing a membrane on the fluid in the fluid reservoir) to push the fluid into the gap.

In an alternative embodiment, the amount of fluid in chambers 130-1 and 130-2 may be fixed. Rigid divider 122 may be moved between elastomeric membranes 126 and 124 to control the curvature of the elastomeric membranes. For example, as the rigid divider is moved closer to elastomeric membrane 126, elastomeric membrane 126 would exhibit more curvature and elastomeric membrane 124 would exhibit less curvature. Similarly, as the rigid divider is moved closer to elastomeric membrane 124, elastomeric membrane 124 would exhibit more curvature and elastomeric membrane 126 would exhibit less curvature.

Figure 6:
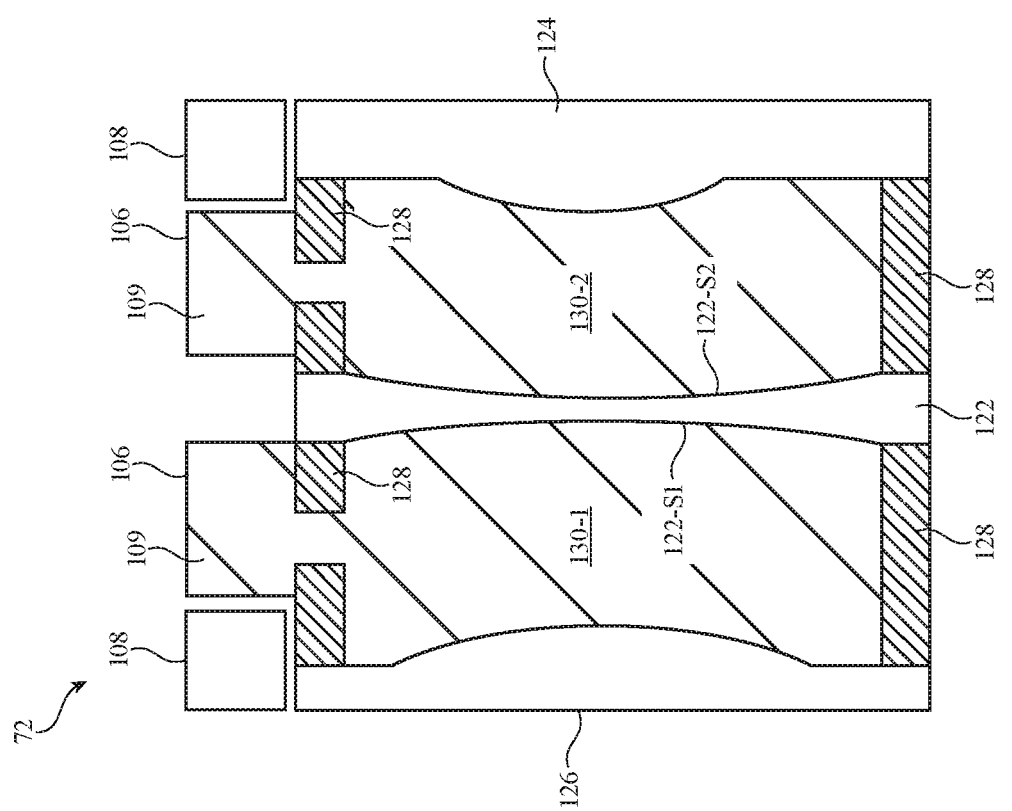
FIG. 6 is a cross-sectional side view of an illustrative lens module for a head-mounted device that includes two fluid-filled chambers separated by a rigid color-corrected lens element having curvature in accordance with an embodiment.

In FIGS. 5A and 5B, rigid divider 122 is depicted as having planar surfaces. This example is merely illustrative. FIG. 6 shows an example of an illustrative lens module having a rigid divider with curved surfaces. As shown in FIG. 6, the lens module 72 has the same structures as the lens module in FIGS. 5A and 5B. However, in FIG. 6, rigid divider 122 has curved surfaces. Rigid divider has first and second opposing surfaces 122-S1 and 122-S2. Surface 122-S1 faces elastomeric membrane 126 and partially defines chamber 130-1. Surface 122-S2 faces elastomeric membrane 124 and partially defines chamber 130-2. As shown in FIG. 6, surfaces 122-S1 and 122-S2 may both be concave. However, this example is merely illustrative. In general, each of surfaces 122-S1 and 122-S2 may be either planar, concave, or convex. Additionally, the rigid divider 122 may have a dispersion (i.e., variation of refractive index versus wavelength) that is selected for achromatic correction. In this way, rigid divider 122 may serve as an achromatic lens element. Lens element 122 may be described as being color-corrected.

Instead of having a rigid lens element between two fluid-filled chambers (as shown in FIGS. 5A, 5B, and 6), a rigid lens element may face the eye box as shown in FIG. 7A. As shown in FIG. 7A, lens module 72 may include an elastomeric membrane 126 between tunable fluid chambers 130-1 and 130-2. Rigid lens element 122 may be formed on the first fluid chamber 130-1 (e.g., facing the eye box) and a second elastomeric membrane 124 may be formed on the second fluid chamber 130-2 (e.g., facing the display). Lens module support structures 128 may also help define the fluid chambers.

Fluid chamber 130-1 is defined by rigid lens element 122, lens module support structures 128, and elastomeric membrane 126. Fluid chamber 130-1 has an inlet 132-1 formed in the lens module support structures. Fluid 109-1 from fluid reservoir 106 may be pumped or forced into the fluid chamber through inlet 132-1 by fluid controlling component 108. Fluid chamber 130-2 is defined by elastomeric membrane 126, lens module support structures 128, and elastomeric membrane 124. Fluid chamber 130-2 has an inlet 132-2 formed in the lens module support structures. Fluid 109-2 from fluid reservoir 106 may be pumped into the fluid chamber through inlet 132-2 by fluid controlling component 108.

Rigid lens element 122 may be formed from glass or another desired transparent material. Elastomeric membrane 126, the fluid in chamber 130-1, divider 122, the fluid in chamber 130-2, and elastomeric membrane 124 (which may all be referred to as respective lens elements) may all have any desired refractive index. In other words, each lens element may have the same refractive index as an adjacent lens element or a different refractive index than an adjacent component. Fluids 109-1 and 109-2 in FIG. 7A may be different types of fluid with different refractive indices.

Similar to as shown in FIGS. 5A and 5B, the amount of fluid in chambers 130-1 and 130-2 may determine the shape of the respective elastomeric membranes. For example, membrane 124 has curvature that is dependent upon the amount of fluid in fluid-filled chamber 130-2. Membrane 126 curvature that is dependent upon the amount of fluid in fluid-filled chamber 130-1. The amount of fluid in each chamber may be independently controlled (e.g., by respective fluid controlling components) to control the lens module 72.

To allow for correction of astigmatism in the user of head-mounted device 10, elastomeric membranes 124 and 126 have varying stiffness across the membranes. One or both of the membranes may have concentric stiffness variation for off-axis optical correction. One or both of the membranes may have linear stiffness variation for astigmatic optical correction. By varying the stiffness across the membranes, the elastomeric membranes will be aspheric (because the more-stiff portions will be less displaced by the fluid in the fluid-filled chamber than the less-stiff portions). For example, elastomeric membrane 126 may be stiffer in the X-axis than in the Y-axis. In contrast, elastomeric membrane 124 may be stiffer in the Y-axis than in the X-axis. Instead, the opposite could be true (with elastomeric membrane 124 stiffer in the X-axis than in the Y-axis and elastomeric membrane 126 stiffer in the Y-axis than in the X-axis). Independently controlling these two membranes allows for astigmatism correction. As discussed in connection with FIGS. 5A and 5B, elastomeric membranes 124 and 126 may have varying thickness profiles, may have surface features for varying elastic modulus profiles, and/or may be formed from an anisotropic material to achieve the desired stiffness profile.

FIG. 7B shows how fluid filled-chambers 130-1 and 130-2 may be filled be different amounts to control the shapes of elastomeric membranes 124 and 126. Fluid controlling components 108 may be controlled by control circuitry 12 (see FIG. 1) to pump a selected amount of fluid into each fluid-filled chamber. Different amounts of fluid may be in each chamber for independent control of elastomeric membranes 124 and 126. In FIG. 7B, more fluid has been pumped into chamber 130-1 than into chamber 130-2. The fluid controlling components may be pumps that pump fluid from reservoirs 106 into fluid-filled chambers 130-1 and 130-2. Fluid controlling components 108 may include one or more stepper motors, piezoelectric actuators, motors, linear electromagnetic actuators, and/or other electronic components that apply a force to the fluid in the fluid reservoir (e.g., by pressing a membrane on the fluid in the fluid reservoir) to push the fluid into the gap.

Figure 8:
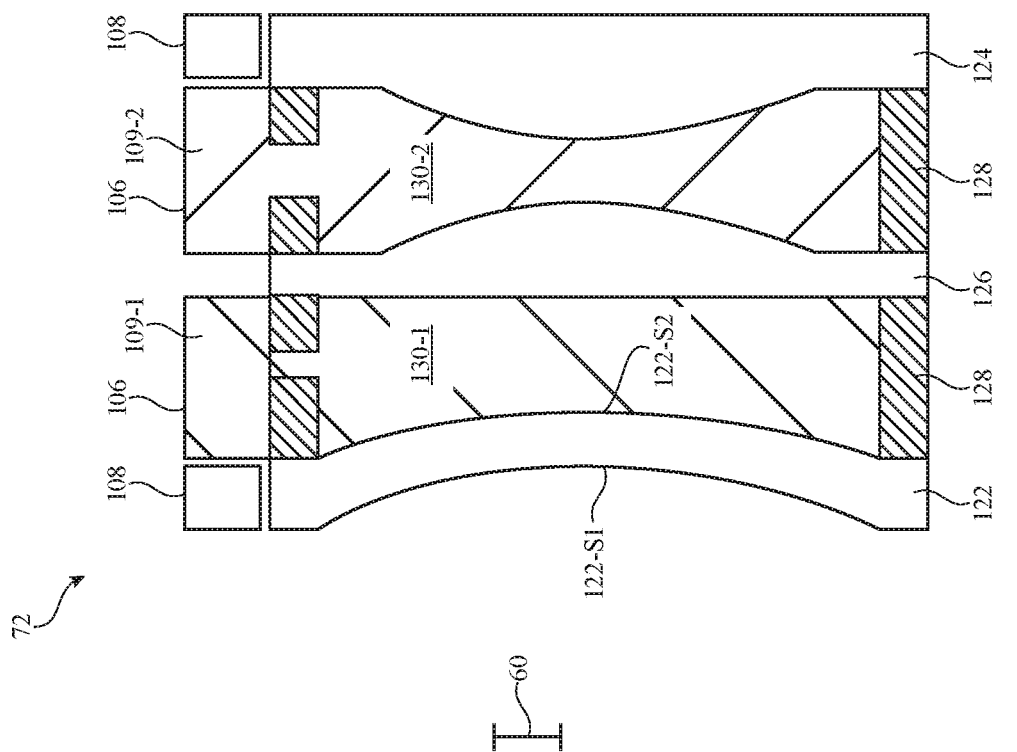
FIG. 8 is a cross-sectional side view of an illustrative lens module for a head-mounted device that includes a rigid lens element having curvature facing an eye box in accordance with an embodiment.

In FIGS. 7A and 7B, rigid lens element 122 is depicted as having planar surfaces. This example is merely illustrative. FIG. 8 shows an example of an illustrative lens module having a rigid lens element with curved surfaces. As shown in FIG. 8, the lens module 72 has the same structures as the lens module in FIGS. 7A and 7B. However, in FIG. 8, rigid lens element 122 has curved surfaces. Rigid lens element 122 has first and second opposing surfaces 122-S1 and 122-S2. Surface 122-S1 faces eye box 60 whereas surface 122-S2 faces elastomeric membrane 126 and partially defines chamber 130-1. As shown in FIG. 8, surface 122-S1 may be concave and 122-S2 may be convex. However, this example is merely illustrative. In general, each of surfaces 122-S1 and 122-S2 may be either planar, concave, or convex.

Figure 9:
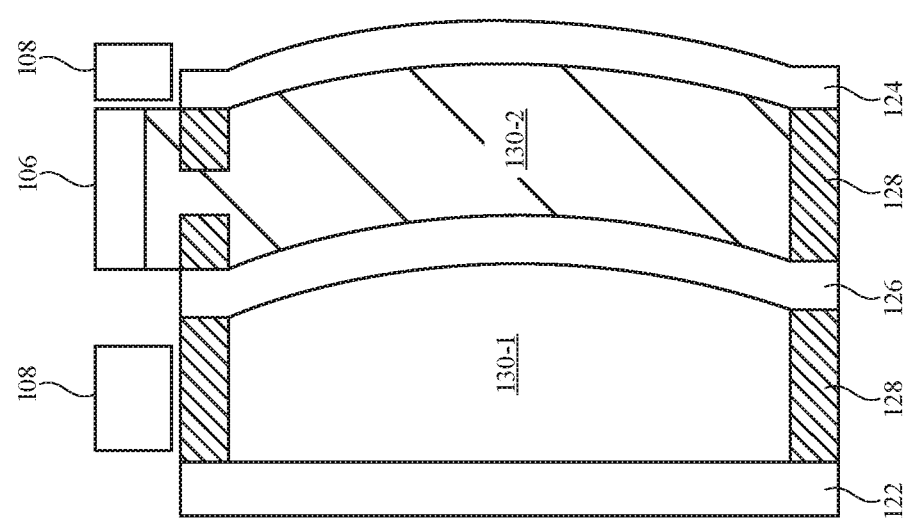
FIG. 9 is a cross-sectional side view of an illustrative lens module for a head-mounted device that includes a variable pressure air-filled chamber in accordance with an embodiment.

In FIGS. 7A and 7B, fluids 109-1 and 109-2 are depicted as being different types of liquids. However, if desired, chamber 130-1 may be instead be filled with air as shown in FIG. 9. A pump such as pump 108 may control the air pressure in chamber 130-1 (sometimes referred to as a variable pressure air-filled chamber), which may control the shape of membrane 126. In general, any of the fluid-filled chambers in the lens modules described herein may optionally include air or another gas instead of a liquid.

In the aforementioned examples, elastomeric membranes have been described as having a varying stiffness profile. In other words, the elastomeric membranes have a stiffness profile that varies across the membrane but does not change over time. This example is merely illustrative. If desired, elastomeric membranes may be provided in lens module 72 that have a stiffness profile that can be dynamically updated during operation of the head-mounted device.

FIG. 10A is a cross-sectional side view of an elastomeric membrane with a tunable stiffness profile. As shown, elastomeric membrane 124 may be coupled to one or more actuators 142. FIG. 10B is a top view showing how actuators 142 may surround the periphery of elastomeric membrane 124. Each actuator may be attached to a respective portion of the elastomeric membrane. Each actuator may optionally move radially outwards away from the physical center 144 of elastomeric membrane 124.

FIG. 10C shows a top view of the elastomeric membrane while being stretched by the actuators. As shown, a first actuator 142-1 may pull the membrane in direction 146-1. A second actuator 142-2 on the opposite side of the membrane from actuator 142-1 may pull the membrane in direction 146-2 opposite direction 146-1. The actuators pulling the membrane in this way effectively stretches the elastomeric membrane along the axis between the two actuators. Actuators may stretch the membrane by varying amounts. For example, a third actuator 142-3 may pull the membrane in direction 146-3 with a smaller amount of force than the first actuator pulls the membrane. A fourth actuator 142-4 on the opposite side of the membrane from actuator 142-3 may pull the membrane in direction 146-4 opposite direction 146-3. Similarly, a fifth actuator 142-5 may pull the membrane in direction 146-5 with a smaller amount of force than the first actuator pulls the membrane. A sixth actuator 142-6 on the opposite side of the membrane from actuator 142-5 may pull the membrane in direction 146-6 opposite direction 146-5. Having the actuators pull the membrane in this way results in a stiffness profile with a first region 124-1 that is stiffer than a second region 124-2.

FIG. 10C depicts each actuator as pulling the membrane in tandem with an actuator on the opposing side of the elastomeric membrane. This example is merely illustrative. Each actuator may be controlled individually to create any desired stiffness profile. Any desired number of actuators 142 may be attached to the elastomeric membrane to stretch the elastomeric membrane (e.g., more than 5, more than 10, more than 15, more than 20, more than 50, less than 75, less than 30, less than 20, less than 10, between 8 and 25, between 15 and 25, etc.). Each actuator may be a piezoelectric actuator, a linear electromagnetic actuator, and/or any other desired electronic component for pulling on the elastomeric membrane.

In FIGS. 10A-10C, elastomeric membrane 124 is depicted as having actuators 142 for dynamically tuning the stiffness profile of the membrane. In other words, the elastomeric membrane 124 in any of the lens modules depicted in FIGS. 5A, 5B, 6, 7A, 7B, 8, and 9 may optionally have this type of tunable membrane. This means that the shape of elastomeric membrane 124 may optionally be controlled by both the actuators 142 and the fluid in the fluid-filled chamber adjacent to the membrane. Elastomeric membrane 126 in any of FIGS. 5A, 5B, 6, 7A, 7B, 8, and 9 may also optionally have this type of tunable membrane.

The example of dynamically tuning the shape of the membrane in a lens module using actuators that selectively stretch the membrane is merely illustrative. If desired, actuators may be included that selectively bend or compress the edge of the elastomeric membrane to dynamically adjust the shape of the elastomeric membrane.

FIG. 11A is a top view of an elastomeric membrane with actuators 148 around the circumference of the elastomeric membrane. Each actuator may be a piezoelectric actuator (e.g., formed from piezo ceramic on either side of a stainless steel substrate). The actuators may form a ring around the elastomeric membrane. Any desired number of actuators may be used to surround the elastomeric membrane (e.g., three, four, more than four, more than six, more than eight, more than ten, more than fifteen, more than twenty, more than fifty, less than fifty, less than thirty, less than fifteen, less than ten, less than six, between six and fifteen, etc.).

FIG. 11B is a cross-sectional side view of an elastomeric membrane that can be controlled by a piezoelectric actuator.

As shown in FIG. 11B, piezoelectric actuator 148 includes first and second piezo ceramic layers 150-1 and 150-2 on opposing sides of a stainless steel substrate 152 (sometimes referred to as substrate 152). By including a piezo ceramic on both sides of the substrate, the piezoelectric actuator may be bent either away from the elastomeric membrane (as in FIG. 11B) or towards the elastomeric membrane (as in FIG. 11C). Because the piezoelectric actuator 148 in FIGS. 11B and 11C has two active layers, it may sometimes be referred to as a piezoelectric bimorph. This example is merely illustrative, and a piezoelectric unimorph (that only bends in one direction) may be used to tune the shape of elastomeric membrane 124 if desired.

The piezoelectric bimorph 148 in FIGS. 11B and 11C is a stainless-steel-based bimorph (with active layers formed on either side of a stainless steel substrate). However, this example is merely illustrative. If desired, the piezoelectric bimorph may instead be an adhesive-based bimorph. Active layers may be formed on either side of an adhesive layer (e.g., substrate 152 in FIGS. 11B and 11C may be an adhesive layer instead of a stainless steel layer). In yet another alternative, the piezoelectric bimorph may be a sintered bimorph (with active layers attached together without an intervening adhesive layer).

As shown in FIGS. 11B and 11C, each piezoelectric actuator 148 may be bent into a desired position to control the shape of elastomeric membrane 124. The piezoelectric actuators may control the curvature of the elastomeric membrane and may optionally change the optical center of the elastomeric membrane (e.g., pressing only one half of the membrane may shift the optical center of the membrane away from the physical center of the membrane). As shown in FIGS. 11B and 11C, the elastomeric membrane controlled by actuator 148 may be adjacent to a fluid-filled chamber (e.g., with fluid 109 in a chamber defined by structures 128 and rigid lens element 122) that also contributes to shaping the elastomeric membrane. The elastomeric membrane 124 in any of the lens modules depicted in FIGS. 5A, 5B, 6, 7A, 7B, 8, and 9 may optionally have an actuator that bends the edge of the membrane for membrane tuning. Elastomeric membrane 126 in any of FIGS. 5A, 5B, 6, 7A, 7B, 8, and 9 may also optionally have this type of tunable membrane.

In FIGS. 11A-11C, piezoelectric actuators attached to the edge of the elastomeric membrane are bent to help tune the shape of the elastomeric membrane. However, other types of actuators may be used for edge compression of the elastomeric membrane for tuning the shape of the elastomeric membrane.

Figure 12B:
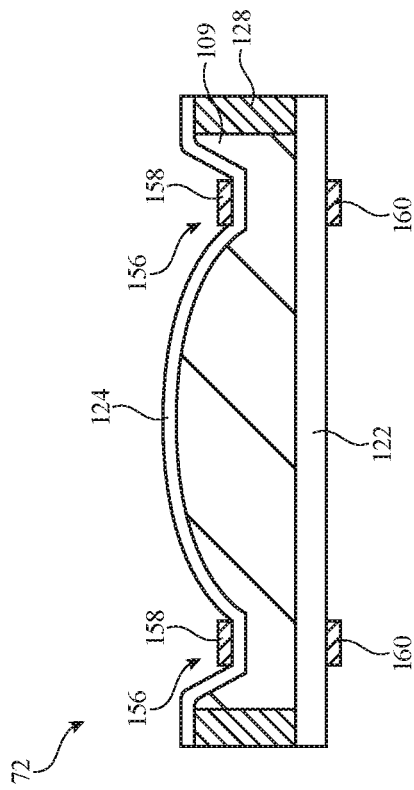
FIGS. 12B and 12C are cross-sectional side views of the elastomeric membrane of FIG. 12A showing how a voice coil actuator may control the shape of the elastomeric membrane in accordance with an embodiment.
Figure 12C:
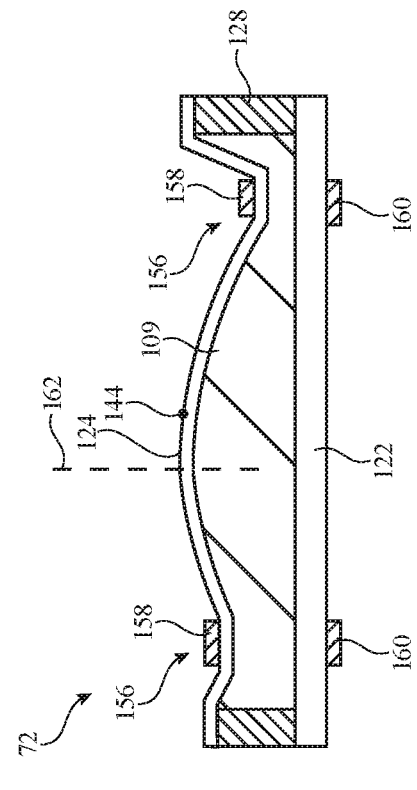
Figure 12A:
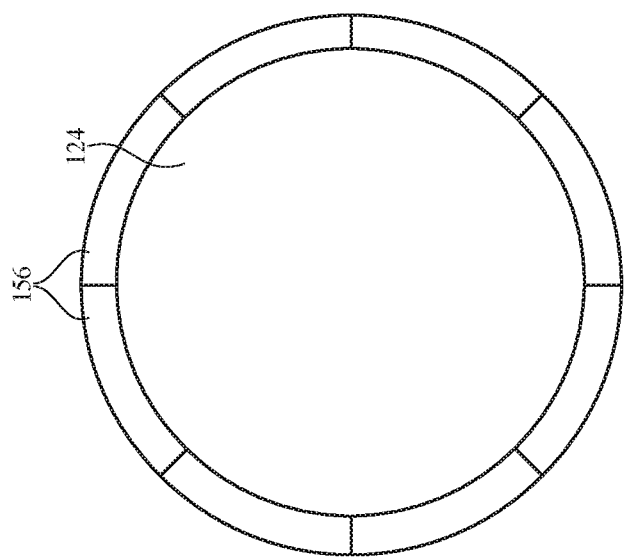
FIG. 12A is a top view of illustrative elastomeric membrane that includes voice coil actuators that are controlled for edge compression in accordance with an embodiment.

FIG. 12A is a top view of an elastomeric membrane with actuators 156 around the circumference of the elastomeric membrane. Each actuator may optionally be a voice coil actuator formed from voice coil structures (sometimes referred to as voice coil paddles) that are pulled together by a varying amount of force. The actuators may form a ring around the elastomeric membrane. Any desired number of actuators may be used to surround the elastomeric membrane (e.g., three, four, more than four, more than six, more than eight, more than ten, more than fifteen, more than twenty, more than fifty, less than fifty, less than thirty, less than fifteen, less than ten, less than six, between six and fifteen, etc.).

FIG. 12B is a cross-sectional side view of a lens module that includes an elastomeric membrane controlled by edge compression using voice coil actuators. As shown in FIG. 12B, the lens module has an elastomeric membrane 124 that, in combination with rigid lens element 122 and structures 128, defines a chamber for fluid 109 (similar to as discussed in connection with FIG. 5A for example). Each voice coil actuator 156 may include a first voice coil structure (e.g., voice coil paddle) 158 on a first side of the elastomeric membrane and a second voice coil structure (e.g., voice coil paddle) 160 on a second side of the rigid lens element 122. One of the voice coil structures may include a coil winding. The magnetic field attracting voice coil structures 158 and 160 to each other may be proportional to the current applied to the coil winding. Therefore, the voice coil structures may be controlled (e.g., by control circuitry 12) to selectively compress the edges of the elastomeric membrane to shape the elastomeric membrane.

As shown in FIG. 12C, a voice coil actuator on one side of the elastomeric membrane may be compressed more than a voice coil actuator on the opposing side of the elastomeric membrane. This may shift the optical center (162) of the elastomeric membrane 124 relative to the physical center (144) of the elastomeric membrane. The optical center of the elastomeric membrane may be controlled to correspond with a user's gaze direction. Control circuitry 12 may obtain gaze detection information from a gaze detection sensor and/or other sensors in the head-mounted device (e.g. sensors 16) and may control the optical center of elastomeric membrane 124 based on the sensor information.

Any of the tunable membranes herein may be tuned based on sensor information from sensors in the head-mounted device (e.g., based on gaze detection information from gaze detection sensors).

The elastomeric membrane 124 in any of the lens modules depicted in FIGS. 5A, 5B, 6, 7A, 7B, 8, and 9 may optionally have a voice coil actuator that compresses the edge of the membrane for membrane tuning. Elastomeric membrane 126 in any of FIGS. 5A, 5B, 6, 7A, 7B, 8, and 9 may also optionally have this type of tunable membrane.

Figure 13:
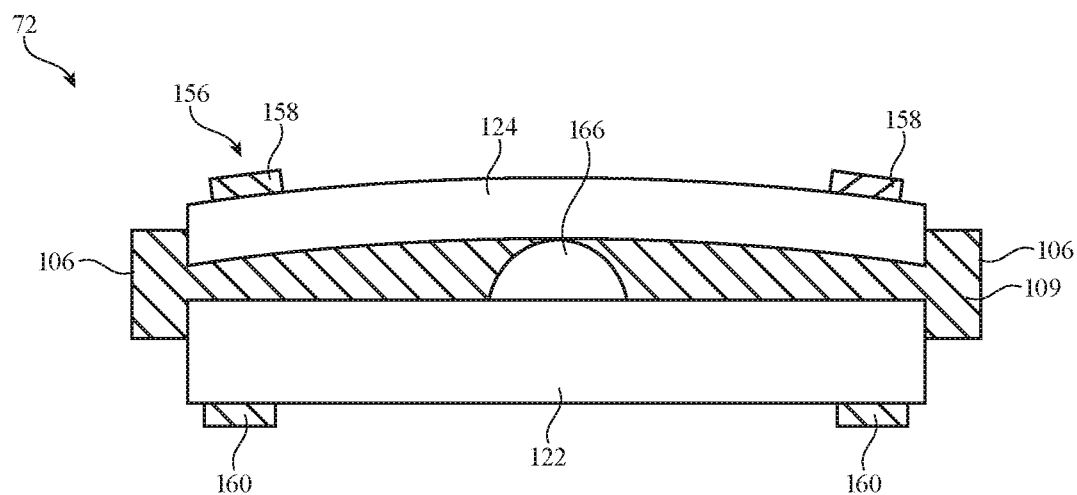
FIG. 13 is a cross-sectional side view of an illustrative lens module having a rigid structure between an elastomeric membrane and a rigid lens element in accordance with an embodiment.

If desired, a lens module of the type shown in FIGS. 12A-12C with voice coil actuators for edge compression may have a rigid structure in the physical center of the elastomeric membrane to help maintain a desired shape for the elastomeric membrane. FIG. 13 shows an embodiment for a lens module where fluid is formed between elastomeric membrane 124 and rigid lens element 122 (e.g., fluid 109 formed between the lens elements and in reservoirs 106). Voice coil actuators 156 on the edges of the lens module may optionally compress the elastomeric membrane towards the rigid lens element. However, a rigid structure 166 with a spherically shaped upper surface may maintain a certain gap between the center of the elastomeric membrane and rigid lens element 122.

Figure 14:
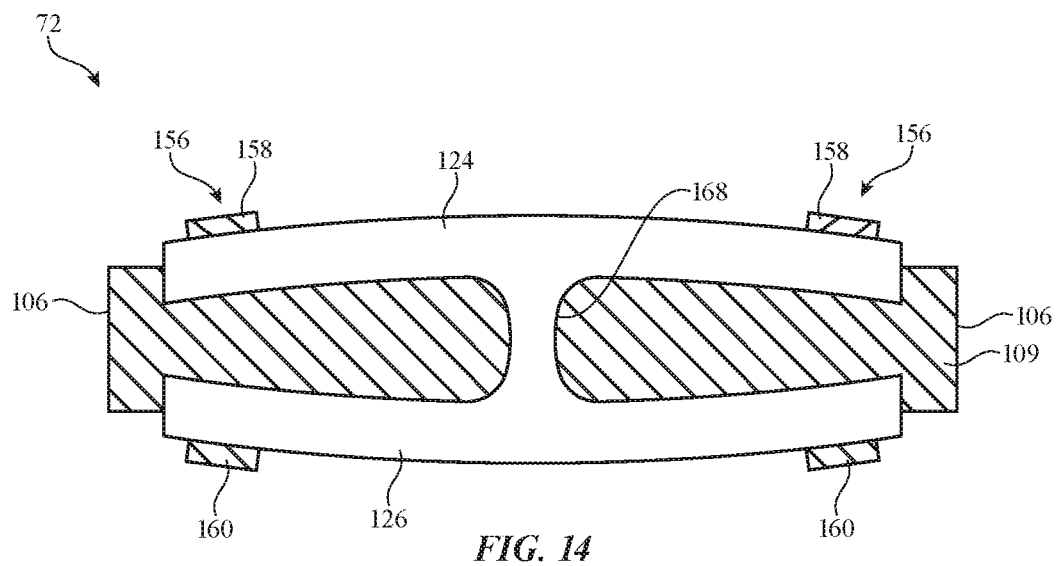
FIG. 14 is a cross-sectional side view of an illustrative lens module having a rigid portion between two elastomeric membranes in accordance with an embodiment.

FIG. 14 shows a similar arrangement as FIG. 13. In FIG. 14, fluid is formed between elastomeric membranes 124 and 126 (e.g., fluid 109 formed between the lens elements and in reservoirs 106). Voice coil actuators 156 on the edges of the lens module may optionally compress the elastomeric membranes towards each other. However, rigid structure 168 (e.g., located at the physical center of the lens module) may maintain a gap of a minimum thickness between the center of the two elastomeric membranes. One or more of elastomeric membranes 124 and 126 and rigid structure 168 may be formed integrally or the components may be formed separately.

In FIGS. 13 and 14, fluid reservoirs 106 are depicted at the periphery of the fluid-filled chamber with fluid 109. It should be understood that the fluid-filled chamber may be defined by a flexible seal that extends around the periphery of the lens elements. As lens element 124 is bent, some of the fluid may be displaced from the volume between lens elements 122 and 124. The displaced fluid may press outward on the flexible material that forms the seal (but may remain contained by the flexible material). In other words, the fluid reservoirs shown in FIGS. 13 and 14 may be formed from displaced fluid that pushes on a flexible layer. This type of arrangement reduces the amount of force required to bend the lens elements and maintains a constant fluid volume present in the lens module.

In some of the aforementioned embodiments, elastomeric membrane 124 is depicted as being circular. This example is merely illustrative. Elastomeric membrane 124 (and any other lens element described herein) may be circular, may be elliptical, or may have any other desired shape.

In several of the aforementioned embodiments, tunable lenses are described that include elastomeric membranes. Each elastomeric membrane may be formed from a natural or synthetic polymer that has a low Young's modulus for high flexibility. For example the elastomeric membrane may be formed from a material having a Young's modulus of less than 1 GPa, less than 0.5 GPa, less than 0.1 GPa, etc.

Alternatively, in some embodiments a tunable lens may include an adjustable element (sometimes referred to as an adjustable lens element or tunable lens element) that is formed from a semi-rigid material instead of (or in addition to) an elastomeric material. The properties of the semi-rigid lens element may result in the semi-rigid lens element becoming rigid along a first axis when the semi-rigid lens element is bent along a second axis that is orthogonal to the first axis.

Figure 15:
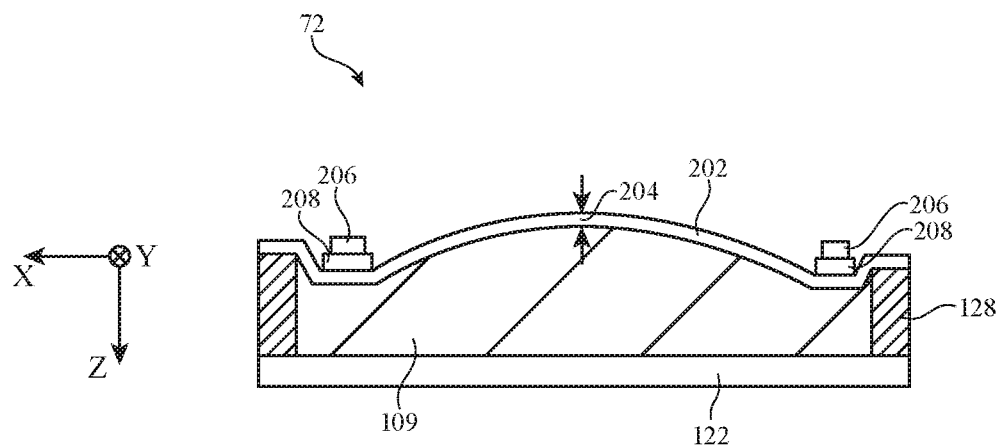
FIG. 15 is a cross-sectional side view of an illustrative lens module having a tunable semi-rigid lens element in accordance with an embodiment.

FIG. 15 is a cross-sectional side view of a lens module 72 that includes a semi-rigid lens element 202. Semi-rigid lens element 202 may, in combination with lens module support structures 128 and rigid lens element 122, define a chamber that is filled with fluid 109.

Semi-rigid lens element 202 may be formed from a semi-rigid material that is stiff and solid, but not inflexible. The semi-rigid lens element 202 may, for example, be formed from a thin layer of polymer or glass. Lens element 202 may be formed from a material having a Young's modulus that is greater than 1 Gpa, greater than 2 GPa, greater than 3 GPa, greater than 10 GPa, greater than 25 GPa, etc. Lens element 202 may be formed from polycarbonate, polyethylene terephthalate (PET), polymethylmethacrylate (PMMA), acrylic, glass, or any other desired material. The properties of lens element 202 may result in the lens element becoming rigid along a first axis when the lens element is curved along a second axis perpendicular to the first axis. This is in contrast to an elastomeric lens element, which remains flexible along a first axis even when the lens element is curved along a second axis perpendicular to the first axis. The properties of semi-rigid lens element 202 may allow the semi-rigid lens element to form a cylindrical lens with tunable lens power and a tunable axis.

As previously mentioned, fluid 109 may fill a chamber defined by semi-rigid lens element 202, lens module support structures 128, and lens element 122. Lens element 122 may be a rigid lens element (e.g., a lens element formed from glass). Lens module support structures 128 may help define a chamber to hold fluid 109. The lens module support structures may be formed from rigid or flexible (elastomeric) materials. Additional fluid reservoirs and fluid controlling components (e.g., pumps) may be included to control the amount of fluid in the chamber if desired.

Fluid 109 may be a liquid, gel, or gas with a predetermined index of refraction (and may therefore sometimes be referred to as liquid 109, gel 109, or gas 109). The fluid may sometimes be referred to as an index-matching oil, an optical oil, an optical fluid, an index-matching material, an index-matching liquid, etc. Lens elements 122 and 202 may have the same index of refraction or may have different indices of refraction. Fluid 109 that fills the chamber between lens elements 122 and 202 may have an index of refraction that is the same as the index of refraction of lens element 122 but different from the index of refraction of lens element 202, may have an index of refraction that is the same as the index of refraction of lens element 202 but different from the index of refraction of lens element 122, may have an index of refraction that is the same as the index of refraction of lens element 122 and lens element 202, or may have an index of refraction that different from the index of refraction of lens element 122 and lens element 122. Lens elements 122 and 202 may be circular, may be elliptical, or may have any another desired shape.

Actuators 206 may be included in lens module 72 to manipulate the position of lens elements such as semi-rigid lens element 202. The actuators may be configured to push or pull a portion of the semi-rigid lens element to change the shape of the semi-rigid lens element. Any desired number of actuators may be included to manipulate the semi-rigid lens element (e.g., two actuators, three actuators, four actuators, six actuators, more than two actuators, more than four actuators, more than six actuators, more than ten actuators, less than ten actuators, etc.). Each actuator may be a piezoelectric actuator, a linear electromagnetic actuator, a voice coil actuator, and/or any other desired electronic component. Control circuitry in the electronic device may control the actuators to control the curvature of the semi-rigid lens element.

Lens module 72 may optionally include a load-spreading ring 208. The load-spreading ring 208 may extend around the periphery of semi-rigid lens element 202. The load-spreading ring may spread force applied to the semi-rigid lens element around the periphery of the semi-rigid lens element (instead of having the force be concentrated at the positions of the actuators). Load-spreading ring 208 may be formed from any desired material. For example, load-spreading ring 208 may be formed from a polymer material such as polycarbonate, polyethylene terephthalate (PET), polymethylmethacrylate (PMMA), or acrylic or the load-spreading ring may be formed from glass. Because the load-spreading ring is formed at the periphery of the lens module, the load-spreading ring may optionally be formed from an opaque material such as metal.

The thickness 204 of semi-rigid lens element 202 may be selected to be sufficiently thin to allow the semi-rigid lens element to flex when manipulated by actuators 206. The semi-rigid lens element 202 may not be able to bend in the desired manner if the lens element is too thick. Thickness 204 may therefore be less than 1.0 millimeter, less than 0.5 millimeters, less than 0.2 millimeters, less than 0.1 millimeter, less than 0.05 millimeters, less than 0.01 millimeter, between 0.01 millimeter and 0.5 millimeters, etc.

Figure 16:
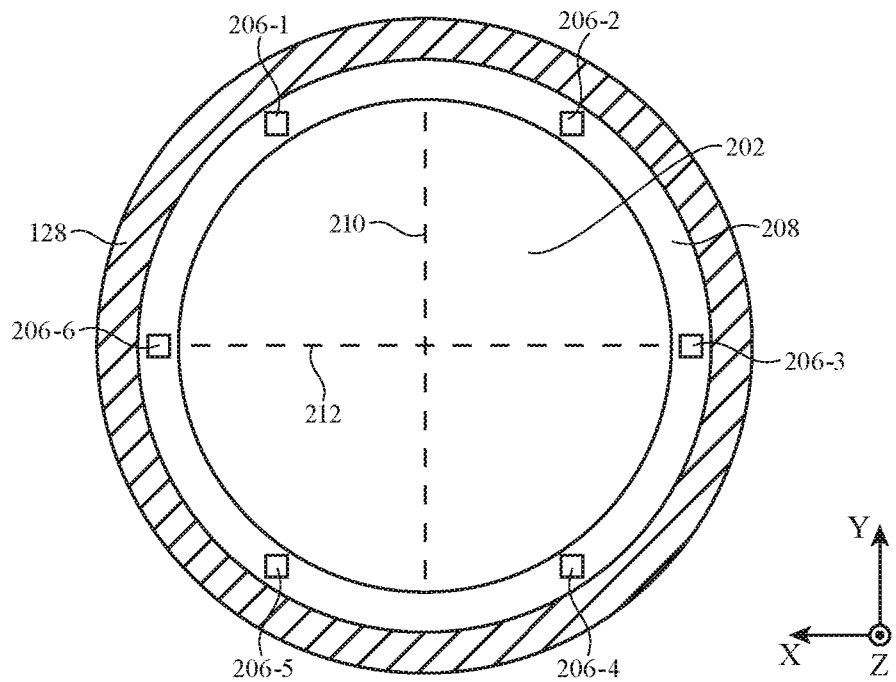
FIG. 16 is a top view of a tunable semi-rigid lens element showing how actuators may be evenly distributed around the periphery of the lens element in accordance with an embodiment.

Actuators 206 may be used to adjust the position of semi-rigid lens element 202 to impart a cylindrical lens power of a variable strength and orientation. FIG. 16 is a top view of lens module 72 showing how actuators 206 are distributed around the periphery of semi-rigid lens element 202. As shown in FIG. 16, six total actuators (actuator 206-1, actuator 206-2, actuator 206-3, actuator 206-4, actuator 206-5, and actuator 206-6) are distributed around the periphery of the semi-rigid lens element. Each of the six actuators may be configured to push down or pull up on the semi-rigid lens element (i.e., to bias the semi-rigid lens element along the Z-axis in the positive Z-direction or the negative Z-direction).

Including six total actuators for manipulating the semi-rigid lens element may enable the selection of any desired cylindrical lens axis for lens element 202. Herein, the term cylindrical lens axis will be used to refer to the axis along which the cylindrical lens has no optical power. It should be understood that the cylindrical lens has an additional axis that is perpendicular to the cylindrical lens axis along which the cylindrical lens has a maximum optical power. The position of the actuators around the periphery of semi-rigid lens element 202 shown in FIG. 16 enables any arbitrary cylindrical lens axis to be selected for the semi-rigid lens element.

For example, consider a scenario in which actuators 206-1, 206-2, 206-4 and 206-5 are used to bias the semi-rigid lens element in the negative Z-direction. Meanwhile actuators 206-3 and 206-6 may bias the semi-rigid lens element in the positive Z-direction. In other words, the portions of semi-rigid lens element 202 biased by actuators 206-3 and 206-6 will be higher (e.g., higher in the positive Z-direction) than the portions of semi-rigid lens element 202 biased by actuators 206-1, 206-2, 206-4, and 206-5. The resulting cylindrical lens axis 212 of this biasing scheme is parallel to the X-axis.

In another scenario, actuators 206-1, 206-2, 206-4 and 206-5 are used to bias the semi-rigid lens element in the positive Z-direction. Meanwhile actuators 206-3 and 206-6 may bias the semi-rigid lens element in the negative Z-direction. In other words, the portions of semi-rigid lens element 202 biased by actuators 206-3 and 206-6 will be lower than the portions of semi-rigid lens element 202 biased by actuators 206-1, 206-2, 206-4, and 206-5. The resulting cylindrical lens axis 210 of this biasing scheme is parallel to the Y-axis.

Biasing the semi-rigid lens element in the positive or negative Z-direction with various subsets of actuators to varying degrees may be used to modify the semi-rigid lens element to have the desired cylindrical lens axis. The degree to which the actuators are biased may control the maximum optical power imparted by the semi-rigid lens element.

It should be understood that the example of the actuators biasing the semi-rigid lens element in the positive and negative Z-direction is merely illustrative. If desired, every actuator may only be able to bias the semi-rigid lens element in one direction and may keep the semi-rigid lens element fixed when not biasing the semi-rigid lens element. The actuators may also bias the semi-rigid lens element in directions other than those parallel to the Z-axis. For example, the actuators may push or pull the semi-rigid lens element towards or away from the center of the semi-rigid lens element (similar to as discussed in connection with FIGS. 10B and 10C, for example).

In the example of FIG. 15, semi-rigid lens element 202 may be planar in its unbiased state. In other words, in the absence of any external influence from the actuators, the semi-rigid lens element 202 may be planar (e.g., parallel to rigid lens element 122). This example, however, is merely illustrative. In other embodiments, the semi-rigid lens element may have an initial non-planar shape (e.g., a spherical lens shape or a spherical dome shape). Additionally, in the lens module shown in FIG. 15, rigid lens element 122 may be interposed between the corresponding eye box and semi-rigid lens element 202. In other words, rigid lens element 122 faces the user in FIG. 15. However, a semi-rigid lens element may instead face the user (with the semi-rigid lens element being interposed between the eye box and the rigid lens element).

Figure 17:
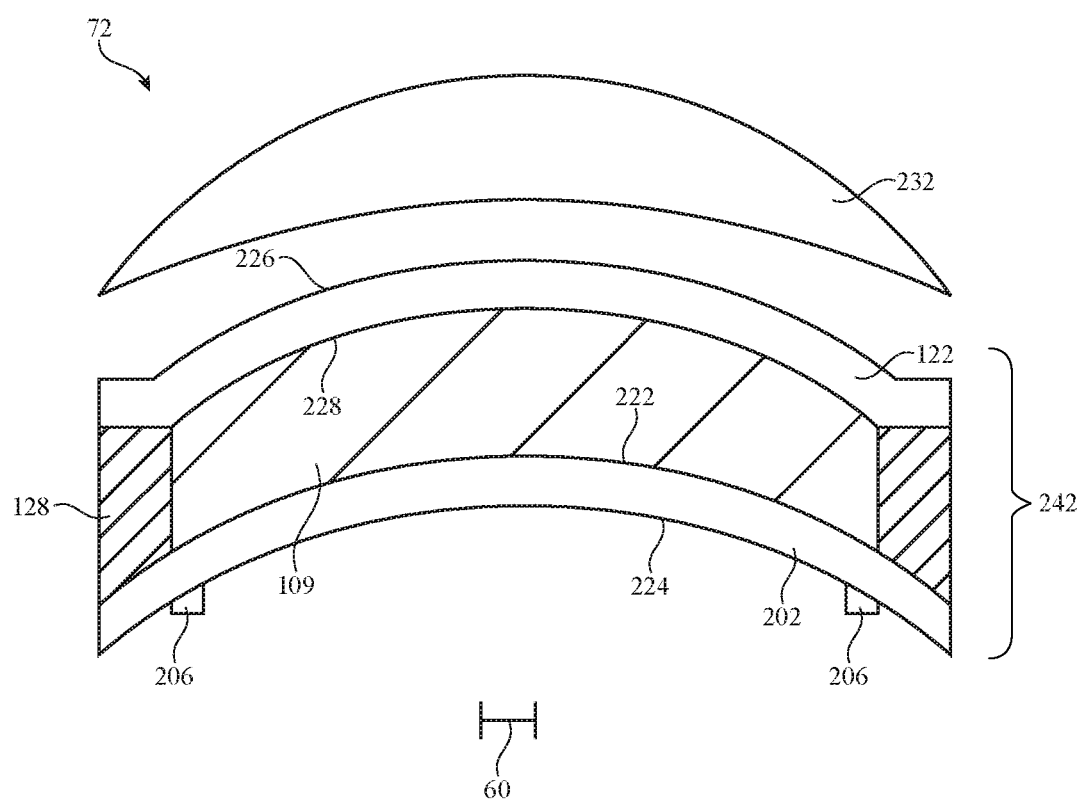
FIG. 17 is a cross-sectional side view of an illustrative lens module having a tunable non-planar semi-rigid lens element and a tunable spherical lens in accordance with an embodiment.

FIG. 17 is a cross-sectional side view of a lens module that includes a non-planar semi-rigid lens element. In FIG. 17, semi-rigid lens element 202 faces the user (e.g., semi-rigid lens element 202 is interposed between eye box 60 and rigid lens element 122). Actuators 206 may be used to manipulate the shape of the semi-rigid lens element 202 (as already discussed in connection with FIGS. 15 and 16). Lens elements 122 and 202 may collectively be referred to as lens 242.

Semi-rigid lens element 202 in FIG. 17 may initially have spherically shaped surfaces. The semi-rigid lens element may be a meniscus lens element having a spherically curved convex surface 222 and a spherically curved concave surface 224. Rigid lens element 122 may also be a meniscus lens element having a spherically curved convex surface 226 and a spherically curved concave surface 228. Without external bias force applied by actuators 206, lens elements 202 and 122 may be parallel.

Actuators 206 may be used to manipulate the shape of semi-rigid lens element 202. Similar to as shown in FIG. 16, six actuators may be evenly distributed around the periphery of the non-planar semi-rigid lens element. This example is merely illustrative, and a different number of actuators may be used if desired (e.g., two actuators, three actuators, four actuators, more than two actuators, more than four actuators, more than six actuators, more than ten actuators, less than ten actuators, etc.).

The properties of lens element 202 may result in the lens element becoming rigid along a first axis when the lens element is curved along a second axis perpendicular to the first axis. Because of the initial spherical shape of the surfaces of lens element 202, the lens element may have biconic surfaces when bent. A biconic surface may have different curvatures along two orthogonal axes.

The semi-rigid lens element introduces two orthogonal cylindrical lens powers when bent along a given axis (while the rigid lens element in the lens remains in a fixed position). The orthogonal cylindrical lens powers may have the same magnitudes or may have different magnitudes. In one example, the semi-rigid lens element may be bent and may have resulting cylindrical lens powers of +0.25 diopter at 90° and −0.25 diopter at 0°. According to the orthogonal cylinder transform, X diopters of 0° cylindrical lens power is equal to X diopters of spherical lens power−X diopters of 90° cylindrical lens power (e.g., +0.25 D CYL 0°=+0.25 D SPHERE+−0.25 D CYL 90°). Taking this rule into account, the equivalent total power of the bent semi-rigid lens element is 0.25 diopters of spherical lens power and −0.5 diopters of 0° cylindrical lens power.

An additional lens element may be included in the lens module to offset for the parasitic spherical lens power generated by lens 242 when semi-rigid lens element 202 is bent. FIG. 17 shows how spherical lens element 232 may be incorporated in lens module 72. In the example described above, the spherical lens may be used to provide −0.25 diopters of spherical lens power. As a result, the lens module would ultimately have −0.5 diopters of 0° cylindrical lens power.

Spherical lens element 232 may be dynamically adjusted to offset the parasitic spherical lens power associated with the given state of lens 242. Spherical lens 232 may be any desired type of tunable spherical lens element.

Figure 18B:
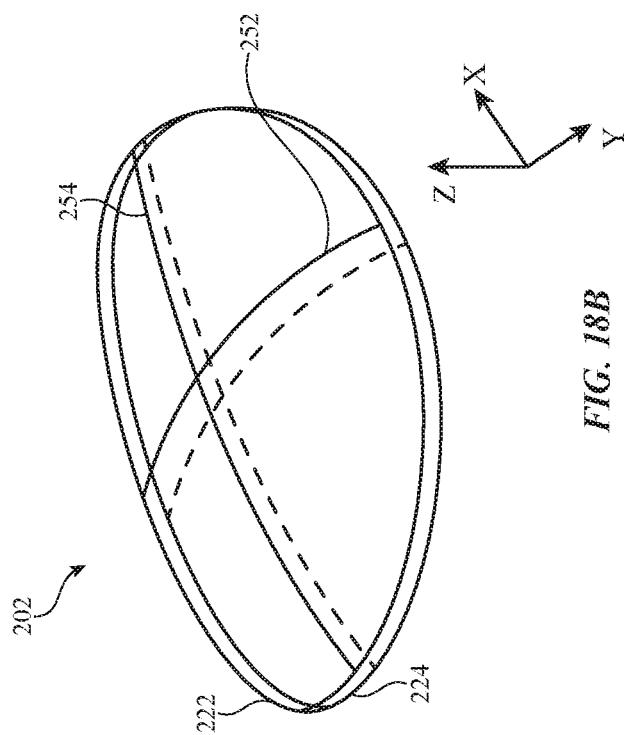
FIG. 18B is a perspective view of the tunable non-planar semi-rigid lens element of FIG. 17 in a bent state in accordance with an embodiment.
Figure 18A:
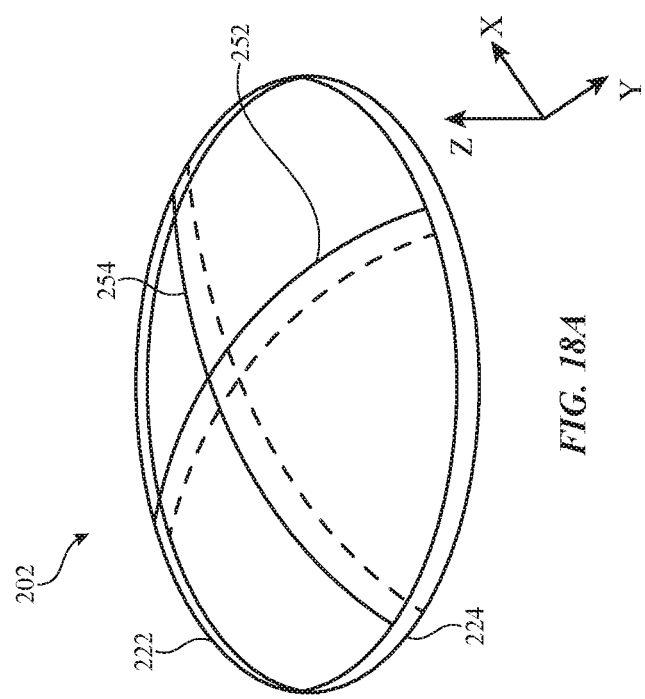
FIG. 18A is a perspective view of the tunable non-planar semi-rigid lens element of FIG. 17 in an unbent state in accordance with an embodiment.

FIGS. 18A and 18B show how a non-planar semi-rigid lens element may be bent to have a biconic surface with different curvatures along two orthogonal axes. FIG. 18A shows non-planar semi-rigid lens element 202 in an initial state. In other words, FIG. 18A shows the semi-rigid lens element before actuators are used to bend the lens element. As shown, the lens element initially has an upper surface 222 that is spherically convex and a lower surface 224 that is spherically concave. In FIG. 18A, the lens element has a first meridian 252 (sometimes referred to as section 252 or contour 252) along the Y-axis and second meridian 254 (sometimes referred to as meridian 254) along the X-axis. In FIG. 18A, the radius of curvature of meridian 252 may be the same as the radius of curvature of meridian 254. In other words, the curvature along orthogonal axes that intersect in the center of the lens element is the same.

In FIG. 18B, the non-planar semi-rigid lens element is shown in bent state. Actuators 206 have been used to bend the semi-rigid lens element along the Y-axis, for example. In this state, the upper and lower surfaces 222 and 224 of the lens element may be biconic surfaces. The radius of curvature of meridian 252 may be different than the radius of curvature of meridian 254. In the bent shape as shown in FIG. 18B (when used in combination with a rigid spherical lens element), two cylindrical lens powers may be produced (e.g., having different magnitudes). In combination with the spherical lens of FIG. 17, a single cylindrical lens power along any desired cylindrical lens axis may be generated. Actuators 206 may selectively bend the non-planar semi-rigid lens element to determine the cylindrical lens axis.

In the embodiment of FIG. 17, a tunable semi-rigid non-planar lens element is interposed between eye box 60 and rigid lens element 122. Rigid lens element 122 is interposed between the tunable semi-rigid non-planar lens element and tunable spherical lens 232. This example is merely illustrative. In general, lens module 72 may include any desired combination of tunable planar semi-rigid lens elements, tunable non-planar semi-rigid lens elements, rigid planar lens elements, rigid non-planar lens elements, tunable elastomeric lens elements, etc.

In one illustrative arrangement, a lens may include a tunable semi-rigid non-planar lens element that is interposed between eye box 60 and another tunable semi-rigid non-planar lens element. Fluid such as fluid 109 may fill a cavity between the two tunable semi-rigid non-planar lens elements. In another embodiment, the rigid lens element 122 in FIG. 17 may be replaced by a tunable planar semi-rigid lens element.

If desired, in some arrangements the semi-rigid lens elements shown in FIGS. 15-18 may be used in combination with the aforementioned variable stiffness concepts (e.g., shown in FIGS. 5-7). As discussed in connection with FIGS. 5-7, a lens element may have a varying stiffness across the lens element to assist in astigmatism correction. A semi-rigid lens element as shown in FIGS. 15-18 may have concentric stiffness variation for off-axis optical correction or linear stiffness variation for astigmatic optical correction. The varying stiffness profile of the semi-rigid lens element may be achieved by providing the semi-rigid lens element with a variable thickness, by providing recesses that selectively reduce stiffness, by forming the semi-rigid lens element from an anisotropic material, etc. In yet another possible arrangement, the semi-rigid lens element may be included in a lens module that also includes an elastomeric lens element that has a varying stiffness profile (e.g., a lens element of the type shown in FIGS. 5-7).

Ultimately, the number, orientation, and stack-up of lens elements incorporated into the lens module may depend on the design requirements of the particular electronic device. However, using lens elements of the type shown in FIGS. 15-18 may provide improved field-of-view for the user of the electronic device and may require less eye relief than when other types of lenses are used. Using a tunable non-planar semi-rigid lens element (as shown in FIG. 17 and FIGS. 18A and 18B) may have improved optical performance due to the surface of the lens having a more uniform distance to the eye box.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A system, comprising:
a head-mounted support structure;
a display having pixels that emit light;
a lens module supported by the head-mounted support structure that receives the light from the pixels, wherein the lens module comprises first and second fluid-filled chambers and first and second flexible membranes, wherein the light emitted by the pixels passes through the first fluid-filled chamber and the second fluid-filled chamber in that order, and wherein the first fluid-filled chamber is interposed between the display and the second fluid-filled chamber; and
control circuitry configured to control the lens module to adjust curvature of the first flexible membrane and curvature of the second flexible membrane.

2. The system defined in claim 1, wherein the control circuitry is configured to change a first amount of fluid in the first fluid-filled chamber and a second amount of fluid in the second fluid-filled chamber to adjust the curvature of the first flexible membrane and the curvature the second flexible membrane.

3. The system defined in claim 1, wherein the first flexible membrane has a first varying stiffness profile and the second flexible membrane has a second varying stiffness profile that is different than the first varying stiffness profile.

4. The system defined in claim 1, wherein the first flexible membrane has a varying thickness.

5. The system defined in claim 1, wherein the first flexible membrane has surface relief that varies the elastic modulus of the first flexible membrane.

6. The system defined in claim 1, wherein the first flexible membrane is formed from an anisotropic material.

7. The system defined in claim 1, wherein the lens module comprises a rigid divider between the first and second fluid-filled chambers, wherein the first fluid-filled chamber is at least partially defined by the rigid divider and the first flexible membrane, and wherein the second fluid-filled chamber is at least partially defined by the rigid divider and the second flexible membrane.

8. The system defined in claim 1, wherein the lens module comprises a rigid lens element, wherein the first flexible membrane is interposed between the first and second fluid-filled chambers, wherein the first fluid-filled chamber is at least partially defined by the rigid lens element and the first flexible membrane, and wherein the second fluid-filled chamber is at least partially defined by the first flexible membrane and the second flexible membrane.

9. The system defined in claim 1, wherein the lens module further comprises:
actuators around a periphery of the first flexible membrane, wherein the control circuitry is configured to control the actuators to dynamically adjust a shape of the first flexible membrane.

10. A system, comprising:
a head-mounted support structure;
a display that emits light;
a lens module supported by the head-mounted support structure that receives the light from the display, wherein the lens module comprises first and second fluid-filled chambers and first and second flexible membranes; and
control circuitry configured to control the lens module to adjust curvature of the first flexible membrane and curvature of the second flexible membrane, wherein the control circuitry is configured to change a first amount of fluid in the first fluid-filled chamber and a second amount of fluid in the second fluid-filled chamber to adjust the curvature of the first flexible membrane and the curvature the second flexible membrane, wherein the first flexible membrane has surface relief that varies the elastic modulus of the first flexible membrane, and wherein the surface relief comprises a plurality of discrete grooves in the first flexible membrane that reduce stiffness in the first flexible membrane.

11. The system defined in claim 10, further comprising:
a first inlet in the first fluid-filled chamber;
a first fluid reservoir, wherein the first inlet is interposed between the first fluid-filled chamber and the first fluid reservoir; and
a fluid controlling component, wherein the control circuitry is configured to use the fluid controlling component to change the first amount of fluid in the first fluid-filled chamber.

12. The system defined in claim 11, wherein the fluid controlling component is configured to apply a force to fluid in the first fluid reservoir to force the fluid through the inlet.

13. A system, comprising:
a head-mounted support structure;
a display that emits light;

a lens module supported by the head-mounted support structure that receives the light from the display, wherein the lens module comprises:
  a first fluid-filled chamber defined by a first flexible membrane and a rigid divider; and
  a second fluid-filled chamber defined by a second flexible membrane and the rigid divider, wherein the rigid divider has first and second opposing surfaces, wherein the first surface directly contacts a first fluid in the first fluid-filled chamber, and wherein the second surface directly contacts a second fluid in the second fluid-filled chamber; and
control circuitry configured to control the lens module to adjust curvature of the first flexible membrane and curvature of the second flexible membrane.

14. The system defined in claim 13, wherein the first surface of the rigid divider is a first planar surface and wherein the second surface of the rigid divider is a second planar surface.

15. The system defined in claim 13, wherein the first surface of the rigid divider is a first curved surface and wherein the second surface of the rigid divider is a second curved surface.

16. The system defined in claim 13, wherein the first surface of the rigid divider is a first concave surface and wherein the second surface of the rigid divider is a second concave surface.

17. The system defined in claim 13, wherein the first surface of the rigid divider is curved.

18. The system defined in claim 13, wherein the rigid divider has a dispersion for achromatic correction.

19. The system defined in claim 13, wherein the control circuitry is configured to change a first amount of the first fluid in the first fluid-filled chamber to adjust the curvature of the first flexible membrane and wherein the control circuitry is configured to change a second amount of the second fluid in the second fluid-filled chamber to adjust the curvature of the second flexible membrane.

20. The system defined in claim 13, wherein the first flexible membrane has a first varying stiffness profile and the second flexible membrane has a second varying stiffness profile that is different than the first varying stiffness profile.

21. A system, comprising:
  a head-mounted support structure;
  a display that emits light;
  a lens module supported by the head-mounted support structure that receives the light from the display, wherein the lens module comprises:
    a first fluid-filled chamber defined by a first flexible membrane and a rigid lens element; and
    a second fluid-filled chamber defined by the first flexible membrane and a second flexible membrane, wherein the first flexible membrane has first and second opposing surfaces, wherein the first surface directly contacts a first fluid in the first fluid-filled chamber, and wherein the second surface directly contacts a second fluid in the second fluid-filled chamber; and
  control circuitry configured to control the lens module to adjust curvature of the first flexible membrane and curvature of the second flexible membrane.

22. The system defined in claim 21, wherein the second fluid-filled chamber is interposed between the display and the first fluid-filled chamber.

23. The system defined in claim 21, wherein the first flexible membrane is interposed between the rigid lens element and the second fluid and wherein the first flexible membrane is interposed between the second flexible membrane and the first fluid.

* * * * *